/ 
US010296475B2

(12) United States Patent
Ueda et al.

(10) Patent No.: US 10,296,475 B2
(45) Date of Patent: May 21, 2019

(54) DATA PROCESSING SYSTEM

(71) Applicant: Renesas Electronics Corporation, Tokyo (JP)

(72) Inventors: Hiroshi Ueda, Tokyo (JP); Ren Imaoka, Tokyo (JP); Seiji Mochizuki, Tokyo (JP); Toshiyuki Kaya, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 147 days.

(21) Appl. No.: 15/144,561

(22) Filed: May 2, 2016

(65) Prior Publication Data

US 2017/0017591 A1    Jan. 19, 2017

(30) Foreign Application Priority Data

Jul. 15, 2015 (JP) ................................ 2015-141111

(51) Int. Cl.
| | |
|---|---|
| *G06F 13/28* | (2006.01) |
| *H04N 19/184* | (2014.01) |
| *H04N 19/42* | (2014.01) |
| *H04N 19/169* | (2014.01) |
| *H04N 19/423* | (2014.01) |
| *H04N 19/436* | (2014.01) |

(52) U.S. Cl.
CPC .......... *G06F 13/28* (2013.01); *H04N 19/184* (2014.11); *H04N 19/188* (2014.11); *H04N 19/42* (2014.11); *H04N 19/423* (2014.11); *H04N 19/436* (2014.11)

(58) Field of Classification Search
CPC .... G06F 13/28; H04N 19/184; H04N 19/188; H04N 19/42; H04N 19/423; H04N 19/436
See application file for complete search history.

(56) References Cited

U.S. PATENT DOCUMENTS

| | | | | |
|---|---|---|---|---|
| 7,139,872 | B1 * | 11/2006 | Bachmat | G06F 11/3447 711/113 |
| 8,189,935 | B2 | 5/2012 | Ueda et al. | |
| 2002/0156985 | A1 * | 10/2002 | Abhyankar | G06F 12/0215 711/154 |
| 2005/0066073 | A1 * | 3/2005 | Jacobs | G06F 13/423 710/15 |

(Continued)

FOREIGN PATENT DOCUMENTS

JP        2009-237888 A    10/2009

*Primary Examiner* — Tim T Vo
*Assistant Examiner* — Harry Z Wang
(74) *Attorney, Agent, or Firm* — McGinn I.P. Law Group, PLLC.

(57) ABSTRACT

A data processing system includes a plurality of data processing devices that perform in parallel data processing on the basis of initial setup data. The data processing devices each has a unique ID and includes a plurality of registers that store the initial setup data and a transfer circuit. The transfer circuit receives packets including a payload that is the initial setup data, shared information, a destination ID and a destination address and, when the shared information indicates that the payload is the initial setup data to be set commonly into the plurality of data processing devices including its own data processing device, transfers the payload to the register that the destination address indicates irrespective of mismatching between the destination ID and its own ID.

22 Claims, 19 Drawing Sheets

(56) References Cited

U.S. PATENT DOCUMENTS

2009/0245662 A1\* 10/2009 Ueda ................... G06F 9/50
                                                         382/233
2011/0064077 A1\* 3/2011 Wen ................... H04L 12/18
                                                         370/390

\* cited by examiner

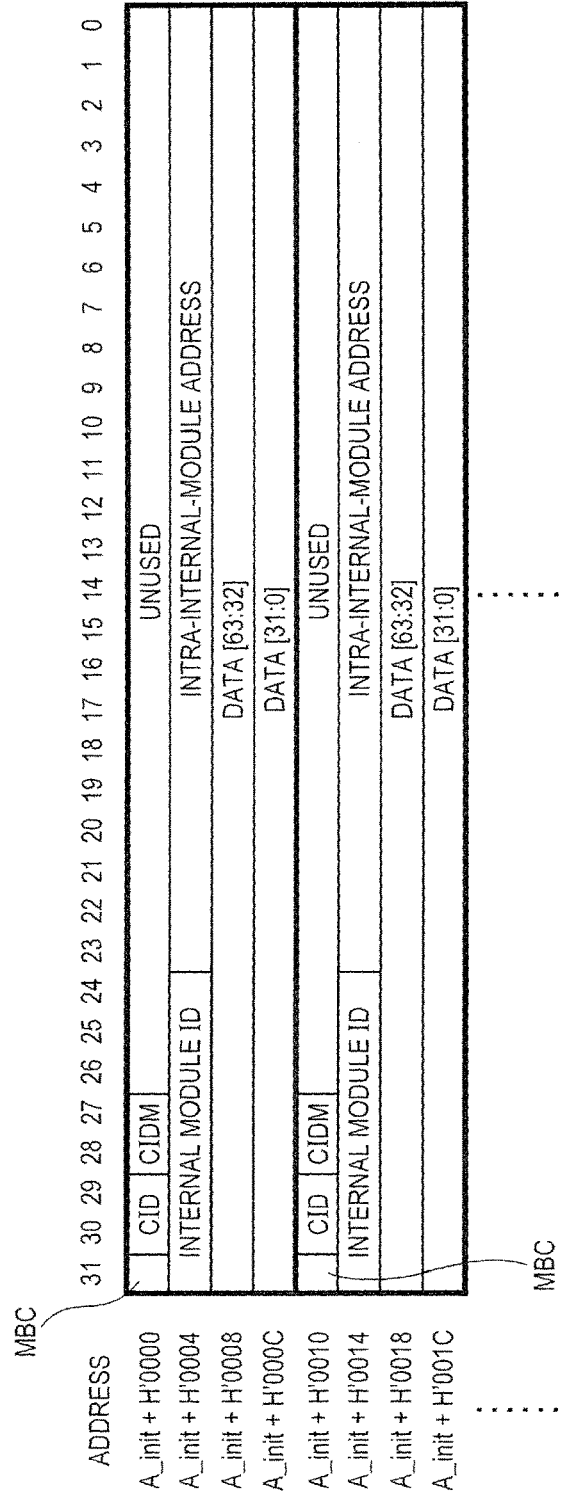

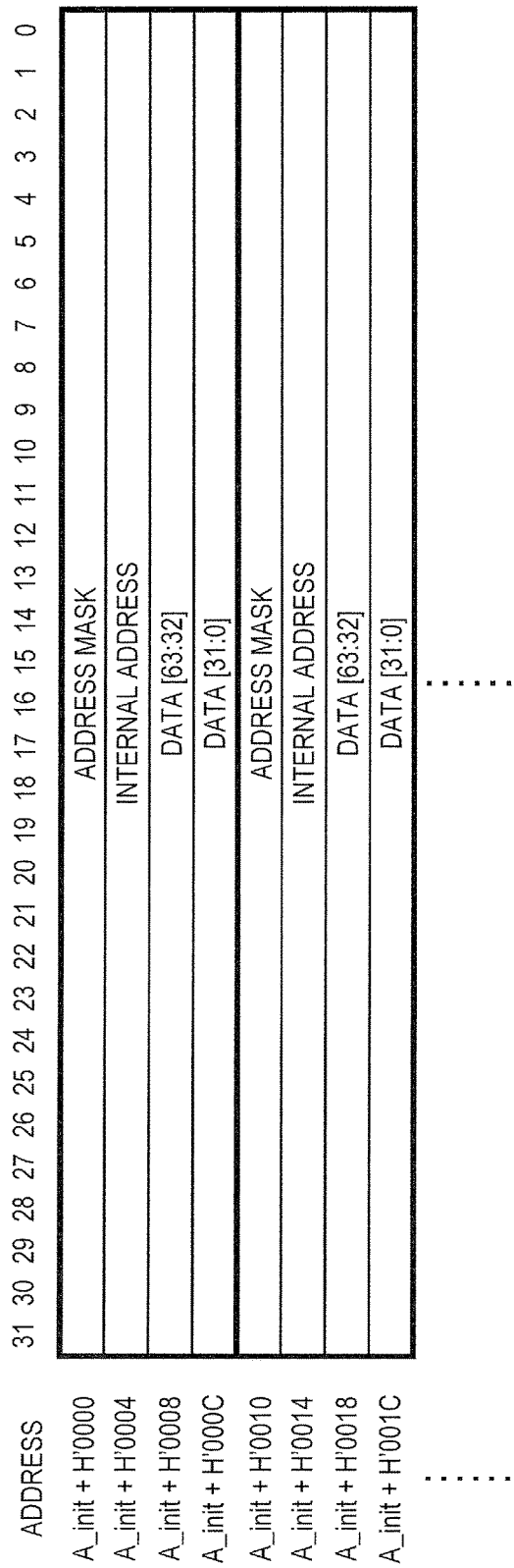

DATA PROCESSING SYSTEM

CROSS-REFERENCE TO RELATED APPLICATIONS

The disclosure of Japanese Patent Application No. 2015-141111 filed on Jul. 15, 2015 including the specification, drawings and abstract is incorporated herein by reference in its entirety.

BACKGROUND

The present invention relates to a data processing system and is, in particular, favorably utilized in the data processing system that includes a plurality of data processing device that perform parallel data processing on the basis of setup data that has been set for each of the data processing devices.

Demand for the data processing system that performs parallel data processing is increasing every year. For example, in a system that handles moving image codes, screen-size increasing such as 4K, 8K and so forth is being promoted. A high processing performance is requested to an image encoding device, an image decoding device and so forth that handle signals of these moving image codes and a technique that a plurality of image processing devices are arranged to perform parallel processing is adopted as one effective measure for improving the processing performance of an image encoding/decoding device.

On the other hand, in Japanese Unexamined Patent Application Publication No, 2009-237888, there is disclosed a data processing device that is favorable for the image encoding/decoding device. The image encoding/decoding device includes a plurality of image processing modules and is configured so as to execute image processing as a whole by appropriately performing the initial settings on the respective image processing modules and thereafter starting up the image processing modules. An external CPU (Central Processing Unit) is operated in order to perform the initial settings on the plurality of image processing modules and therefore a technology for reducing a processing load on the CPU imposed when performing the initial settings is disclosed in Japanese Unexamined Patent Application Publication No. 2009-237888. Thereby, in the data processing device such as the image encoding/decoding device that frequently performs the initial settings on a large amount of data, the processing load on the external CPU is reduced. In particular, in data processing such as encoding, decoding and so forth, there are cases where the data processing device is used by making a switch between encoding processing and decoding processing frame by frame, there are cases where the data processing device is used by switching the type of a codec used (the type of an algorithm used) frame by frame and there are cases other than the above. Since there exists a peculiar situation that it is inevitable to perform register setting and program file replacement in units of frames in such a case, it is particularly important to reduce the processing load imposed on the CPU when performing the initial settings.

SUMMARY

As a result of investigations that the inventors and others of the present invention have made on the technology disclosed in Japanese Unexamined Patent Application Publication No. 2009-237888, it was found that there exist new subjects as follows.

In Japanese Unexamined Patent Application Publication No. 2009-237888, since there exists the peculiar situation that it is inevitable to perform register setting and program file replacement in units of frames in signal processing such as encoding, decoding and so forth as described above, in particular, it has been pointed out that it is important to reduce the processing load imposed on the CPU when performing the initial settings. Such a subject is solved by the invention described in Japanese Unexamined Patent Application Publication No. 2009-237888. The inventors and others of the present invention have thought that parallel processing of data is favorable in order to further meet such new demands by coping with screen size increasing of an image as mentioned above and so forth in future and discussed about new subjects which would occur in that case.

It is thought that parallel processing of data in image processing is implemented by multiplying the number of the image processing modules to be loaded on the image encoding/decoding device and parallelizing the image processing modules so multiplied or by loading and parallelizing the plurality of image encoding/decoding devices themselves. On that occasion, when it is intended to perform the initial settings on the plurality of image processing modules and the plurality of image encoding/decoding devices that have been parallelized (multiplied by a factor of n; n is an integer) in a state of leaving one CPU that performs the initial settings as it is or leaving the number of the CPUs that would be desirable in the device irrespective of parallelization unchanged, without parallelizing the CPU in conformity to parallelization of the image processing modules and the image encoding/decoding devices, the processing load imposed on the CPU due to performance of the initial settings would be multiplied by the factor of n. Although the processing load imposed on the CPU due to performance of the initial settings on one image processing module and one image encoding/decoding device is reduced, the fact remains that the processing load is multiplied by the factor n due to parallelization of the image processing devices and the image encoding/decoding devices.

When although the data processing devices such as the image processing modules, the image encoding/decoding devices and so forth are parallelized by the factor of n, the CPU that performs the initial settings on the data processing devices is not parallelized, it is important to reduce an increase in processing load imposed on the CPU due to performance of the initial settings to an extent that is less than the factor of n.

Although measures for solving the above-mentioned subjects will be described as follows, other subjects and novel features of the present invention will become apparent from description of the specification and the appended drawings of the present invention.

According to one embodiment of the present invention, a data processing system is configured as follows.

That is, the data processing system includes a plurality data processing devices that include a plurality of registers and make it possible to execute data processing based on initial setup data to be set into the register concerned in parallel and is configured as follows.

The plurality of data processing devices each has its own unique identifier. An address is allocated to each of the plurality of registers and the initial setup data is stored into each register. Each of the data processing devices includes a transfer circuit that receives a plurality of packets including the initial setup data and transfers the packets so received to the plurality of registers. Here, the packets include a payload, shared information, a destination identifier, a destination address and so forth. The initial setup data is included as the payload.

The transfer circuit performs the following operations when the packets have been received.

When the shared information included in the packet concerned indicates that the payload included in the packet concerned is setup data to be commonly set into at least some data processing devices including its own data processing device in the plurality of data processing devices, the transfer circuit sets the payload concerned into the registers corresponding to the destination address.

When the shared information included in the packet concerned indicates that the payload included in the packet concerned is not the setup data to be commonly set into the plurality of data processing devices, the transfer circuit sets the payload concerned into the register corresponding to the destination address on condition that the destination identifier matches its own identifier.

Advantageous effects brought about by the above-mentioned one embodiment will be briefly described as follows.

That is, when although the data processing devices are parallelized by the factor of n, the CPU that performs the initial settings on the data processing devices is not parallelized, it is possible to reduce an increase in processing load imposed on the CPU due to performance of the initial settings concerned to an extent that is less than the factor of n.

BRIEF DESCRIPTION OF THE DRAWINGS

FIG. 12 is an explanatory diagram illustrating one configurational example of packets in the data processing system according to the fifth embodiment.

FIG. 13 is an explanatory diagram illustrating one configurational example of an address of an internal bus in a data processing system according to a sixth embodiment of the present invention.

FIG. 14 is an explanatory diagram illustrating one configurational example of packets in the data processing system according to the sixth embodiment.

DETAILED DESCRIPTION

In the following, preferred embodiments of the present invention will be described in detail. Incidentally, in all drawings for illustrating the embodiments of the present invention, the same numerals are assigned to the elements having the same functions and repetitive description thereon is omitted.

First Embodiment

Figure 1:
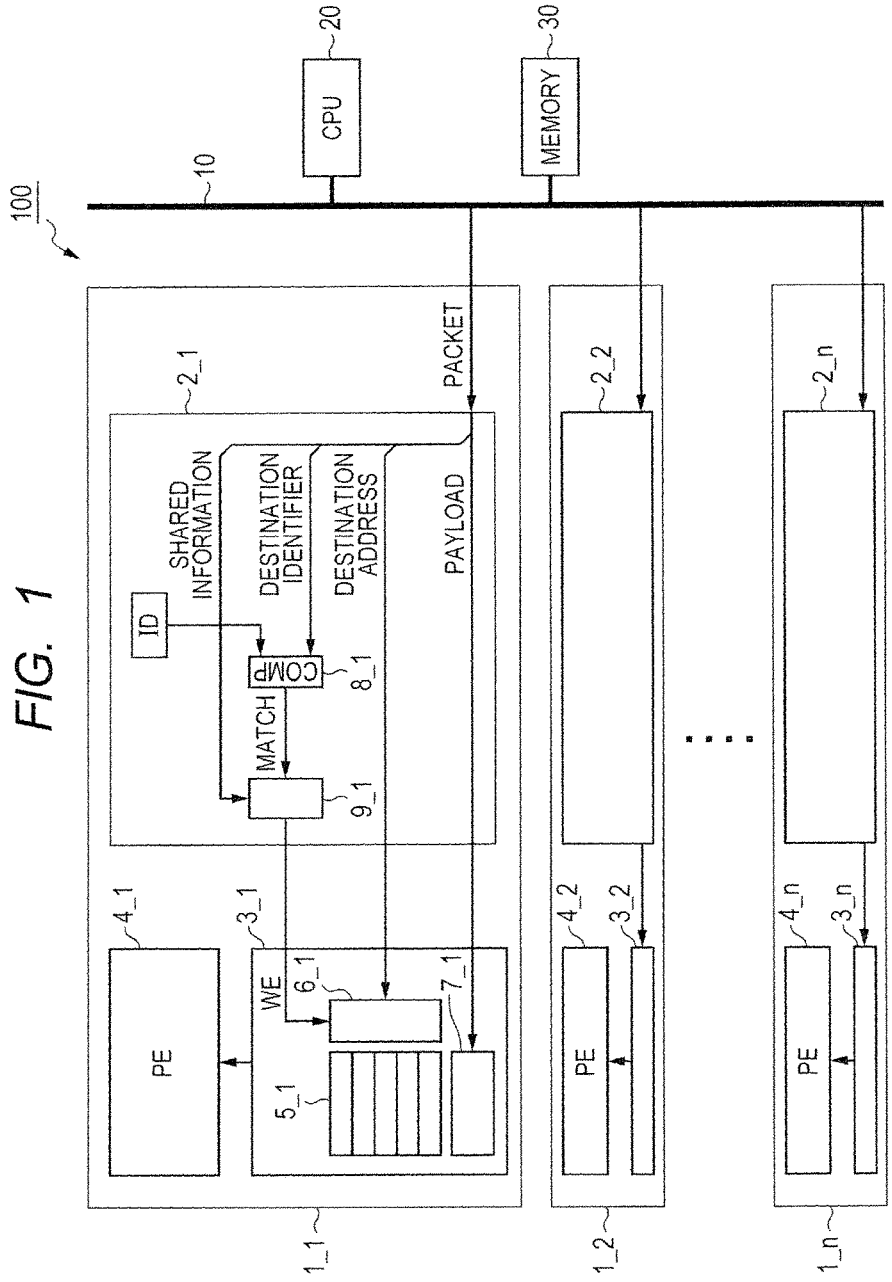
FIG. 1 is a block diagram illustrating one configurational example of a data processing system according to a first embodiment of the present invention.

FIG. 1 is a block diagram illustrating one configurational example of a data processing system 100 according to the first embodiment of the present invention. The data processing system 100 includes a plurality of data processing devices 1_1 to 1_n that include a plurality of setup registers and make it possible to execute data processing based on initial setup data that is set into the setup register concerned in parallel. Here, n is an integer of 2 or more. Although, in FIG. 1, wiring is packaged each by an optional number of signal lines, no distinction is made on whether one or a plurality of signal line(s) is/are packaged and a so-called vector notation is omitted. The same also applies to other drawings in the specification of the present application.

Although there is no particular limit, for example, the plurality of data processing devices 1_1 to 1_n are coupled to a common bus 10 together with a CPU 20 and a memory 30 and are formed on a single semiconductor substrate as an integrated circuit. The memory 30 may be coupled to the outside of the semiconductor substrate concerned via an interface. The setup data (the initial setup data) to be set into each of the data processing devices 1_1 to 1_n is stored in the memory 30, is read out of the memory 30 under the control of the CPU 20 and is supplied to and set into each of the data processing devices 1_1 to 1_n as packets. It is possible for the CPU 20 to operate such that the setup data is written in advance into the memory 30 and address information on the setup data is given to each of the data processing devices 1_1 to 1_n so as to make each of the data processing devices 1_1 to 1_n gain access to the memory 30 autonomously and make each of the data processing devices 1_1 to 1_n read the initial setup data that is desirable for itself out of the memory 30. Thereby, it becomes possible to greatly reduce the processing load on the CPU 20. On the other hand, instead of making each of the data processing devices 1_1 to 1_n gain access to the memory 30 autonomously, a direct memory access control circuit (DMAC: Direct Memory Access Controller) may be coupled onto the bus 10 so as to transfer the setup data from the memory 30 to each of the data processing devices 1_1 to 1_n. However, in this case, it is desirable for the CPU 20 to control the direct memory access control circuit and therefore the processing load on the CPU 20 becomes heavier than that in the above-mentioned system of making each of the data processing devices 1_1 to 1_n gain access to the memory 30 autonomously. In addition, the CPU 20 may gain access to the memory 30, may read the setup data out of the memory 30 and may transfer the setup data to each of the data processing devices 1_1 to 1_n. However, in this case, the processing load on the CPU 20 becomes heavier than before and therefore a higher processing performance is desired to the CPU 20. Incidentally, the bus 10 may be replaced with one of other coupling systems.

The plurality of data processing devices 1_1 to 1_n respectively include transfer circuits 2_1 to 2_n, setup registers 3_1 to 3_n, data processing circuits (PE: Processing Element) 4_1 to 4_n and so forth. Each of the setup registers 3_1 to 3_n may be configured by a plurality of registers 5_1 to 5_n (only the register 5_1 is illustrated) and operates so as to give a function, a parameter and so forth to each of data processing circuits 4_1 to 4_n. When the setup register 3_1 is configured by the plurality of registers 5_1, the setup register 3_1 may be configured by including, for example, an address decoder 6_1 and a write buffer 7_1. Although illustration of the inside of the setup registers 3_2 to 3_n in other data processing devices 1_2 to 1_n is omitted, the setup registers 3_2 to 3_n may be either configured in the same manner as the setup register 3_1 or configured differently from the setup register 3_1. In addition, the data processing circuit 4_1 to 4_n and the setup registers 3_1 to 3_n may not necessarily be gathered together to one place as illustrated in FIG. 1 and the data processing circuits 4_1 to 4_n each may further include a plurality of data processing modules and the plurality of registers that configure the setup registers 3_1 to 3_n may be distributedly coupled to the plurality of data processing modules. The plurality of data processing devices 1_1 to 1_n respectively have unique identifiers (IDs) and the setup data is distributedly stored into the plurality of setup registers 3_1 to 3_n with the addresses being allocated. The transfer circuits 2_1 to 2_n are included in the respective data processing devices 1_1 to 1_n, receive a plurality of packets including the setup data and transfer the received packets to the corresponding setup registers 3_1 to 3_n.

The packets to be read out of the memory 30 include a payload that is the setup data, shared information, a destination identifier, a destination address and so forth. The destination identifier is an identifier (ID) of the data processing device to which the setup data included in the payload in the packet concerned is to be set and the destination address is an address of the register to which the setup data is to be set. The shared information is information used for specifying the target data processing device together with the destination identifier when there exist the plurality of target data processing devices to which the setup data included in the payload in the packet concerned is to be set. In a simplest form, the shared information is a flag configured by one bit and indicates that the setup data included in the payload in the packet concerned is commonly set into all of the data processing circuits 1_1 to 1_n. In another form, the shared information is a mask configured by bits of the same number as bits of the destination identifier and it is possible to indicate that the plurality of data processing devices are the target data processing devices by excluding some bits in the destination identifier from targets to be compared with the unique identifier (ID) of the data processing device concerned. It is possible to appropriately change a way of giving the shared information in accordance with the degree of freedom when designating the target data processing device(s). Incidentally, the same values are allocated to at least some address bits in the target registers to be commonly set in the plurality of registers included in the plurality of data processing devices so as to make it possible to designate the target registers commonly to the above-mentioned destination address.

When the packets have been received, each of the transfer circuits 2_1 to 2_n analyses the received packets, transfers and writes the payload in the packet concerned into each of the designated setup registers 3_1 to 3_n and thereby sets the setup data into the appropriate setup registers. When the shared information included in the received packets indicates that the payload included in the packet concerned is the setup data to be commonly set into at least some data processing devices including its own data processing device in the plurality of data processing devices 1_1 to 1_n, the payload concerned is set into the setup registers corresponding to the destination address irrespective of whether the destination identifier matches its own identifier (ID). When the shared information included in the received packets indicates that the payload included in the packet concerned is not the setup data to be commonly set into the plurality of data processing devices 1_1 to 1_n, the payload concerned is set into the setup register corresponding to the destination address on condition that the destination identifier matches its own identifier (ID). When the identifiers do not mutually match, the packets are ignored or discarded.

As exemplified by, for example, the transfer circuit 2_1, each transfer circuit includes a comparison circuit (8_1), a write enable generation circuit (9_1) and so forth. The destination identifier included in the received packets is compared with the identifier (ID) that is unique to the corresponding data processing device 1_1 by the comparison circuit 8_1 and a result of comparison as to whether the identifiers mutually match is output. The result of comparison is input into the write enable generation circuit 9_1, is changed on the basis of the shared information included in the received packets and is output as a write enable signal WE of the setup register 3_1. FIG. 1 illustrates one example that the setup data included in the payload in the packet concerned is a 1-bit flag indicating that the setup data is to be commonly set into all of the data processing devices 1_1 to 1_n. When the shared information is set, the setup data included in the payload is written into the registers that are designated by the destination address in the plurality of registers 5_1 to 5_n irrespective of the result of comparison by the comparison circuit 8_1. Here, in order to make such a configuration effectively function, it is preferable that address allocation be performed on the data processing circuits 4_1 to 4_n, the setup registers 3_1 to 3_n and the plurality of registers 5_1 to 5_n that respectively configure the setup registers 3_1 to 3_n in all of the data processing devices 1_1 to 1_n in the same manner. It is preferable to allocate the same address to the commonly set registers at least in the commonly set data processing devices.

Figure 2:
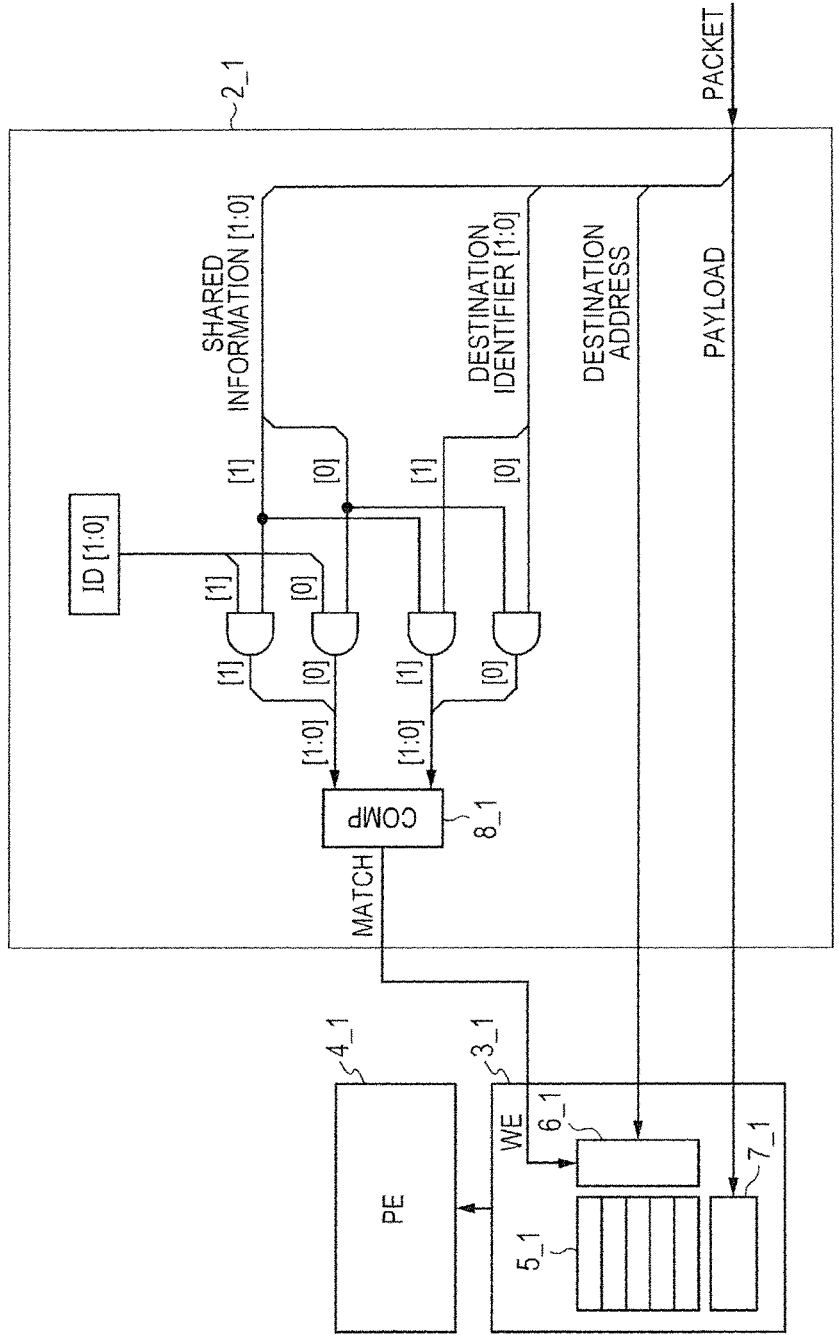
FIG. 2 is a block diagram illustrating another configurational example of a transfer circuit.

FIG. 2 is a block diagram illustrating another configurational example of the transfer circuit. In FIG. 2, another configurational example of, for example, the transfer circuit 2_1 is illustrated. The example that the shared information is the mask that is configured by the bits of the same number as those of the destination identifier is illustrated. The example that each of the shared information, the destination identifier and the unique identifier (ID) of the data processing device is configured by two bits is illustrated. The destination identifier and the identifier (ID) unique to the data processing device concerned are ANDed with the shared information that is the mask bit by bit and the ANDed value is input into the 2-bit comparison circuit 8_1. When the comparison result indicates matching between the identifiers, the result is output as the write enable signal WE of the setup register 3_1. Only low-order bits [0] of the destination identifier and the unique identifier (ID) of the data processing device are mutually compared by setting "0" to the high-order bit [1] of the shared information that is the mask. When the destination identifier has an odd number, the setup data is commonly written into the data processing devices 1_1 and 1_3 having the odd-numbered identifiers (IDs). While, when the destination identifier has an even number, the setup data is commonly written into the data processing devices 1_2 and 1_4 having the even-numbered identifiers (IDs). Here, that the number of bits has been set to 2 is merely one example and the number of bits may be optionally changed. In addition, as the mask, an OR operation may be used in place of the AND operation. Whether a positive logic or a negative logic is adopted is optional. It becomes possible to indicate that the plurality of data processing devices are the targets for setting the common initial setup data by excluding some bits in the destination identifier from the target for comparison with the unique identifier (ID) of the data processing device in this way. It is possible to appropriately change the way of giving the shared information in accordance with the degree of freedom when designating the target data processing devices.

Thereby, when although the data processing devices 1_1 to 1_n are parallelized by the factor of n, the CPU 20 that performs the initial settings on the data processing device is not parallelized, it becomes possible to reduce an increase in processing load imposed on the CPU due to performance of the initial settings to an extent that is less than the factor of n. In addition, it is also possible to suppress an increase in size of a memory area for storing the packets in the memory 30 to an extent that is less than the factor of n.

In the following, more detailed embodiments will be described. An example that data processing is image encoding and decoding and register setting to the data processing devices is the initial settings performed on the image encoding/decoding devices/modules performed in units of pictures (frames, fields and so forth) is adopted. However, the example is merely one example and the respective embodiments which will be described in the following are widely applicable to general data processing and register setting for controlling the data processing.

Second Embodiment

Figure 3:
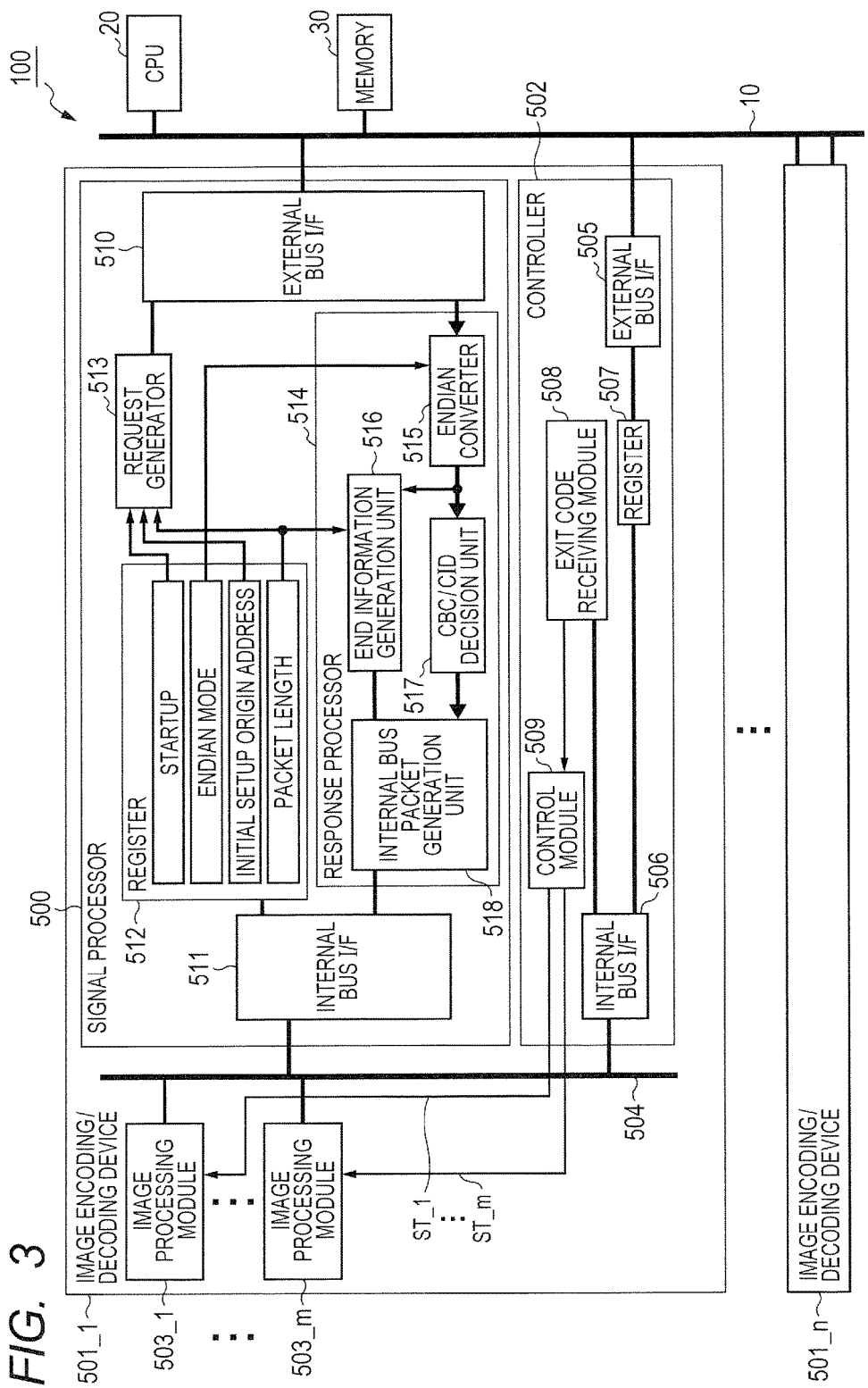
FIG. 3 is a block diagram illustration one configurational example of a data processing system according to a second embodiment of the present invention.

FIG. 3 is a block diagram illustrating one configurational example of a data processing system 100 according to the second embodiment of the present invention.

501_1 to 501_n are image encoding/decoding devices. The image encoding/decoding devices are one example of the data processing devices 1_1 to 1_n in the above-mentioned first embodiment, include a function of image encoding/decoding processing and are configured to be operable in parallel. In addition, unique IDs (identifiers) are respectively allocated to the image encoding/decoding devices 501_1 to 501_n. The ID may be made to be settable to the register and so forth or may be incorporated as a logical value in a logical circuit. Although in the second embodiment, description will be made on a case where n (n is an integer of 2 or more) image encoding/decoding devices are installed, the number of the image encoding/decoding devices to be installed may be optionally set in accordance with the performance that is desired to the data processing system 100. 20 is the CPU, 10 is the bus and 30 is the memory. The image encoding/decoding devices 501_1 to 501_n are coupled to the CPU 20 and the memory 30 via the bus 10. Although illustration is omitted, an image input device, an image output device, a bus arbitration circuit for the bus 10, a direct memory access control circuit, an interruption control circuit, memories other than the memory 30, other peripheral circuit modules and so forth may be further coupled to the image encoding/decoding devices. In addition, the bus 10 may be hierarchized or may be separated into several sections by a bus bridge and so forth. Further, the above-mentioned constitutional elements may be mutually coupled via a communication path other than the bus 10. The initial setup data for defining functions and operations of the image encoding/decoding devices 501_1 to 501_n is temporarily written and stored into the memory 30 and is transferred and written into each of the image encoding/decoding devices 501_1 to 501_n by the CPU 20. Switching from the bus 10 to another communication path that implementation of this function is possible may be optionally performed. In addition, it is possible for the memory 30 to store image data desirable for image processing such as, for example, captured image data, local reference images, encoded bit streams and so forth. Although there is no particular limit, the data processing system 100 is formed on a single semiconductor substrate made of silicon and so forth by using, for example, a well-known technology for manufacturing CMOS (Complementary Metal-Oxide Semiconductor field effect transistor) LSI (Large Scale Integrated circuit). On that occasion, the memory 30 may be formed on the same chip or may be externally attached via an interface and an external terminal.

A configurational example of each of the image encoding/decoding devices 501_1 to 501_n will be described. Although the image encoding/decoding devices 501_1 to 501_n may have the same configuration or may have different configurations, here, the configurational example will be described by giving the image encoding/decoding device 501_1 by way of example.

The image encoding/decoding device 501_1 includes a signal processor 500, a controller 502, a plurality of image processing modules 503_1 to 503_m and so forth that are coupled together via an internal bus 504. The controller 502 is a module configured to control the image encoding/decoding device 501_1. The signal processor 500 is configured to gain access to the memory 30 and read the stored initial setup data out of the memory 30.

The image processing modules 503_1 to 503_m each is a functional module that performs image data processing that configures a partial unit of image encoding/decoding processing that the image encoding/decoding device 501_1 executes. Although illustration is omitted, registers configured to perform the initial settings on contents, parameters and so forth of data processing to be executed are included. The registers may be distributedly installed in the respective image processing modules 503_1 to 503_m or may be mounted as one independent module so as to be commonly used among the devices. Each of the image processing modules 503_1 to 503_m executes image data processing such as, for example, orthogonal transform, inverse orthogonal transform, quantization, inverse quantization, motion vector detection and so forth on the basis of the initial setup data set into each register. The register and the respective image processing modules 503_1 to 503_m are implementation examples of the data processing circuit 4_1 and the setup register 3_1 in the above-mentioned first embodiment. The functional module may not necessarily be implemented by the plurality of image processing modules 503_1 to 503_m and may be implemented by, for example, one high-performance image processing module. The degree of freedom is improved by implementing the functional module by the plurality of image processing modules such that the performance is increased by making the image processing modules execute the same processing in parallel or the throughput is improved by making the image processing modules execute mutually different types of processing in the form of a pipeline. The image processing modules 503_1 to 503_m are implemented by logical circuits, processors and so forth whose functions are switched by the register.

A configuration of the controller 502 will be described. 505 is an interface for communication with the external bus 10. 506 is an interface for communication with the internal bus 504. 507 is a register configured to receive a setup value sent from the external bus 10 and store the setup value. 508 is an exit code receiving module configured to receive an exit code indicating that transfer of the initial setup data to be transferred from the signal processor 500 has been terminated. 509 is a control module configured to control the image processing modules 503_1 to 503_m and the signal processor 500. The control module 509 sends startup signals ST_1 to ST_m to the respective signal processing modules 501_1 to 503_m on the basis of the exit code that the exit code receiving module 508 receives.

A configuration of the signal processor 500 will be described. The signal processor 500 is coupled to the bus 10 via an external bus interface (I/F) 510. In addition, the signal processor 500 is coupled to the internal bus 504 via an internal bus interface (I/F) 511. 512 is a register configured to store information that is desirable for gaining access to the memory 30 in order to read in the initial setup data. A packet length indicative of a data amount of the initial setup data, an initial setup start address indicative of an origin of the initial setup data in the memory 30, an endian mode indicative of an endian of the initial setup data, startup control information (a startup bit) for starting up initial setup data transfer and so forth are set into the register 512. 513 is a request generator that generates a request to the bus 10 on the basis of the setup value set in the register 512. 514 is a response processor that processes a response from the bus 10. The response processor 514 includes an endian converter 515 configured to perform endian conversion of response data from the bus 10, an end information generation unit 516 that generates initial setup data transfer end information and sends the information to the controller 502, a CBC/CID decision unit 517 that decides later described CBC and CID, an internal bus packet generation unit 518 and so forth. The function of the transfer circuit 2_1 in the above-mentioned first embodiment is implemented in the response processor 514.

When it is ensured that the endian of data used in the image encoding/decoding device 501_1 and the image processing modules 503_1 to 503_m matches the endian used in the memory 30 and the bus 10, setting of the endian mode into the register 512 and use of the endian converter 515 are eliminated. On the other hand, even when the endian of the setup data to be set into the setup register that the data processing device (the image encoding/decoding device) includes is different from that of the packets to be stored into the memory 30, it is possible to absorb a difference in endian by loading the register 512 and the endian converter 515 and therefore it is possible to improve the degree of freedom in combination of the data processing device (the image encoding/decoding device) with the bus and the CPU. For example, when the image encoding/decoding device that is one kind of the data processing device is configured as an IP (Intellectual Property) so as to be used in various data processing systems, it is possible to improve versatility of design properties.

Figure 4:
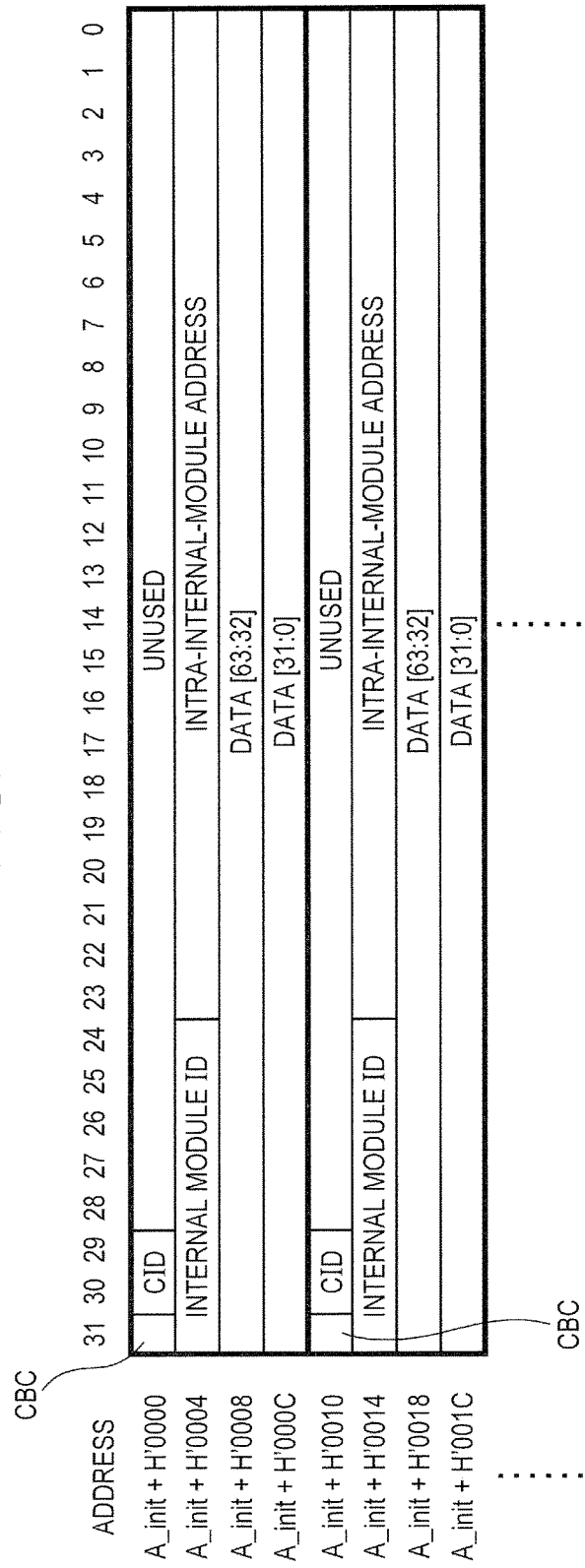
FIG. 4 is an explanatory diagram illustrating one configurational example of packets in the data processing system according to the second embodiment.

FIG. 4 is an explanatory diagram illustrating one configurational example of packets in the data processing system 100. FIG. 4 schematically illustrates one example of an address of the memory 30 and data to be stored into the memory 30. In the packets, one word is configured by 32 bits and each address is allocated to every eight bits. One packet is configured by four words and 128 bits. The address configuration of the memory 30 and the bit configuration of the packets are optional and by how many bits configure one packet is also optional. Every 32-bit data are stored in the memory 30 in units of four addresses. A first packet is configured by 128 bits that are stored into from the initial setup start addresses A_init+H'0000 to A_init+H'000C in units of 32 bits. A second packet is configured by 128 bits that are stored into from the next addresses A_init+H'0010 to A_init+H'001C in units of 32 bits. Here, "H" means a hexadecimal number.

CBC and CID that are features of the present embodiment are stored in the first 32 bits of one packet. CID is an ID of one image encoding/decoding device that is the destination of the packets in the image encoding/decoding devices 501_1 to 501_n. CBC is a bit indicative of the packets to be commonly into all of the image encoding/decoding devices 501_1 to 501_n. Although in FIG. 4, CID is indicated by two bits, it is possible to change the number of bits to be allocated to CID in accordance with the number of the image encoding/decoding devices installed. Next 32 bits are used as bits for storage of the internal module ID and an intra-internal-module address. The internal module ID is an ID of one image processing module that is the destination of the packets in the image processing modules 503_1 to 503_m and the intra-internal-module address is an address of one setup register corresponding to the above-mentioned image processing module. Although in FIG. 4, the internal module ID is indicted by 8 bits and the intra-internal-module address is indicated by 24 bits, it is possible to optionally set the number of bits used for each of the internal module ID and the intra-internal-module address in accordance with the number of the image processing modules installed and the number of the setup registers installed. 64 bits that follow the above-mentioned bits are allocated to the payload of the packets and are used as bits for storing the initial setup data to be transferred to the internal module concerned. Data ranging from the first packet to the last packet is stored into an area that is formed successively from the initial setup start addresses A_init.

An operation of the data processing system 100 according to the second embodiment will be described.

The CPU 20 generates the packets for the initial setup data desirable for the operation of each of the image encoding/decoding devices 501_1 to 501_n in accordance with a format as illustrated in FIG. 4 and writes and temporarily stores the packets so generated into the memory 30. Here, the "initial setup data" is the setup data for defining the function of each of the image encoding/decoding devices 501_1 to 501_n. It is possible to generate the setup data picture by picture (the frame, the field and so forth) so as to set or change the function of each of the image encoding/decoding devices 501_1 to 501_n in the next picture. It is possible for the CPU 20 to adaptively change the contents of succeeding processing on the basis of a result of ever performed image processing. For example, the CPU 20 changes the contents of processing of the next picture in accordance with a result of processing of the previous picture. There are cases where the initial setup data is the setup value that is common among all of the image encoding/decoding devices 501_1 to 501_n. When the packets for the initial setup data are to be generated in such a case, the bit of CBC is set to "1". When bits are set for each of the image encoding/decoding devices 501_1 to 501_n individually, "0" is set for the bit of CBC and the ID of the setting destination image encoding/decoding device is stored into the CID bit.

Figure 5:
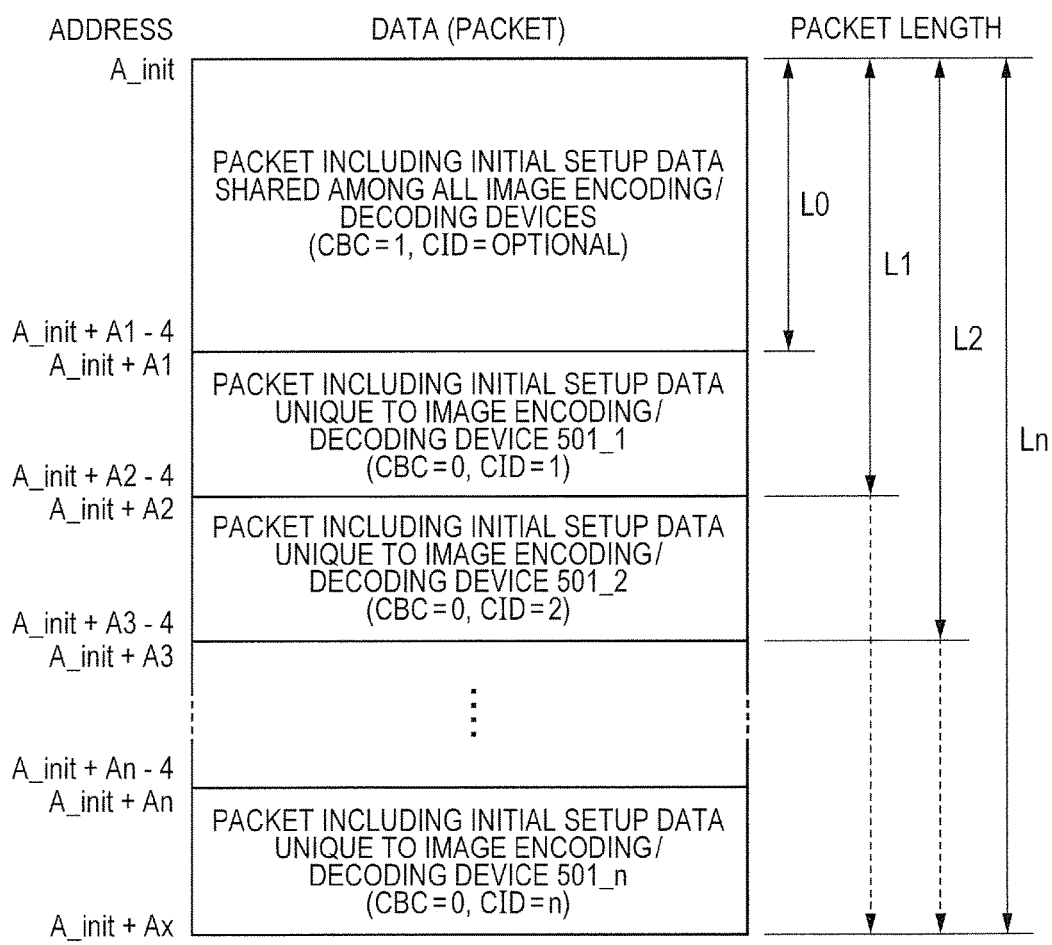
FIG. 5 is an explanatory diagram illustrating one example of a storage state of the packets into a memory.

FIG. 5 is an explanatory diagram illustrating one example of the storage state of the packets into the memory 30. A first packet that "1" has been set for the bit of CBC and that includes the initial setup data that is common among all of the image encoding/decoding devise 501_1 to 501_n is stored starting from the initial setup start address A_init by a length L0 and then a second packet that begins with an address A_init+A1 and includes the initial setup data that is unique to the image encoding/decoding device 501_1 is stored. In these packets, "0" is set to the bit of CBC and the ID of the image encoding/decoding device 501_1 is set to the bit of CID. The packet length of the packets to be transferred to the image encoding/decoding device 501_1 reaches L1. Then, a third packet that begins with an address A_init+A2 and includes the initial setup data that is unique to the image encoding/decoding device 501_2 is stored. In the third packet, "0" is set to the bit of CBC and the ID of the image encoding/decoding device 501_2 is set to the bit of CID. Since the packets to be transferred to the image encoding/decoding device 501_2 includes the packet that includes the initial setup data that is common among all of the image encoding/decoding devices 501_1 to 501_n, the packet length reaches L2. Likewise, the packets that include the initial setup data that is unique to each of the image encoding/decoding devices counted down to the last image encoding/decoding device 501_n are stored. The packet length of the packets to be transferred to the last image encoding/decoding device 501_n reaches Ln. However, the packet lengths may not necessarily have mutually different values and may be defined as Ln uniformly. In addition, the order that the areas for storing the packets including the initial setup data that is common among all of the image encoding/decoding devices 501_1 to 501_n and the areas for storing the packets that include the initial setup data that is unique to each of the image encoding/decoding devices 501_1 to 501_n are arranged is optional. It goes without saying that the packets that include the initial setup data that is common among all of the image encoding/decoding devices 501_1 to 501_n and the packets that include the initial setup data that is unique to each of the image encoding/decoding devices 501_1 to 501_n may not necessarily be stored into gathered areas and may be separately stored in units of packets.

The CPU 20 writes and temporarily stores the initial setup data into the memory 30, thereafter sets the information that is desirable for transfer of the initial setup data into the register 512 in the signal processor 500 via the controller 502 through the bus 10 and starts up the image encoding/decoding device 501_1. The information that is desirable for transfer of the initial setup data includes the packet length indicative of the total number of packets for the initial setup data, the initial setup start address indicative of in which address in the memory 30 the initial setup data is stored, the endian mode indicative of the endian of the initial setup data that is stored in the memory 30 and so forth. The controller 502 receives the above-mentioned information via the external bus I/F 505 and stores the information into the register 507. When the image encoding/decoding device 501_1 is started up, the controller 502 transfers the information that is desirable for transfer of the initial setup data from its own register 507 to the signal processor 500 via the internal bus I/F 506 and the internal bus 504 and thereafter sets a startup bit of the register 512 of the signal processor 500.

The signal processor 500 receives the information that is desirable for transfer of the initial setup data from the controller 502 via the internal bus 504, stores the information into the register 512 and starts transfer of the initial setup data by waiting until the startup bit is set. When the startup bit is set into the register 512, the request generator 513 generates a read request to be sent to the memory 30 on the basis of the information on the initial setup start address, the packet length and so forth set in the register. The generated read request is output onto the bus 10 via the external bus I/F 510 and is sent to the memory 30. More specifically, the read request is input into a not illustrated bus arbitration circuit, is subjected to arbitration with other bus right requests and is sent to the memory 30 after the bus right has been acquired. However, the above-mentioned operation is merely one example and bus specifications including the arbitration system are optional.

A read response that has been read out of the memory 30 in accordance with the read request is input into the response processor 514. In the response processor 514, the read response so read-out is converted into the endian of response data in accordance with information on the endian mode by the endian converter 515 and is sent so as to be subjected to processing to be performed at a rear stage. In the CBC/CID decision unit 517, CBC/CID decision processing is performed on the packets for the initial setup data. When "1" is set for the CBC bit or when the CBC bit is "0" and the CID bit indicates its own ID, it is decided that the packets for the initial setup data concerned are valid and the packets are sent to the internal bus packet generation unit 518. The internal bus packet generation unit 518 sends the initial setup data to the register that has the address set in the intra-internal-module address bit of the image processing module corresponding to the ID set in the internal module ID bit.

The end information generation unit 516 counts the number of the packets for the initial setup data that has been transferred from the memory 30 and detects the last packet from the information on the packet length set in the register 512. In a case where the last initial setup data packet is detected, the exit code indicative of completion of transfer of the initial setup data is sent to the controller 502. Although the exit code is transferred via the internal bus 504, an exclusive signal line running from the end information generation unit 516 to the exit code receiving module 508 may be added. Although in the present embodiment, description has been made on the example that the information on the packet length is used, information indicative of an end packet as described in the related art may be used. That is, a flag bit indicative of whether it is the end packet is set for each packet in place of setting the packet length into the register 512. The end information generation unit 516 monitors the flag bit of each packet. When the flag is put up and it is detected that the packet concerned is the end packet, the end information generation unit 516 sends the exit code indicative of completion of transfer of the initial setup data to the controller 502.

When the exit code is received from the signal processor 500, the exit code receiving module 508 of the controller 502 sends a signal indicative of completion of transfer of the initial setup data to the control module 509. The control module 509 sends the startup signals ST_1 to ST_m respectively to the image processing modules 503_1 to 503_m. The image processing modules 503_1 to 503_m each starts image encoding/decoding processing in accordance with the setup value of the transferred initial setup data.

The second embodiment mainly features provision of the CBC bit indicative of setting to be common among all of the image encoding/decoding devices 501_1 to 501_n and the CID bit indicative of the specific image encoding/decoding device in the packets for the initial setup data and provision of the CBC/CID decision unit 517 in the response processor 514 in association with provision of the CBC bit and the CID bit.

Figure 6:
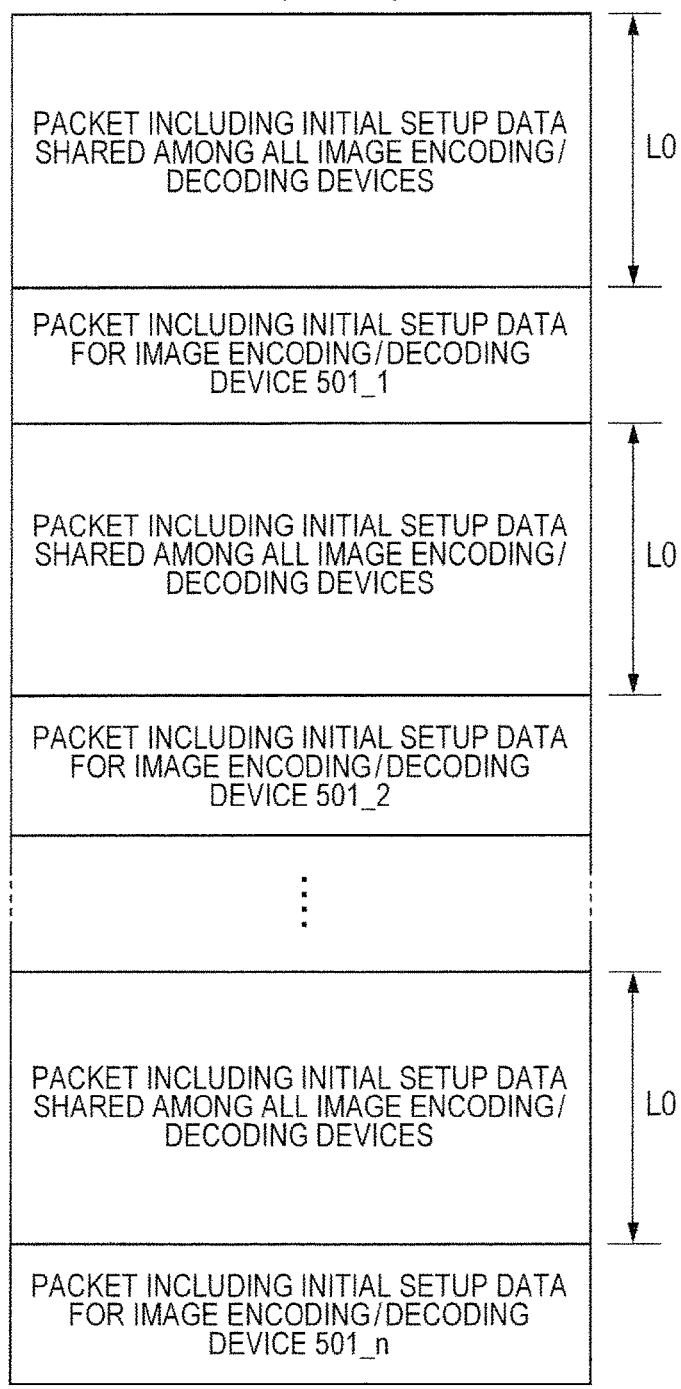
FIG. 6 is an explanatory diagram illustrating one example of a storage state of the packets into the memory when not utilizing information indicative of setup to be common among all of image encoding/decoding devices.

Advantageous effects brought about by the above-mentioned features will be described by using FIG. 5 and FIG. 6. FIG. 6 is an explanatory diagram illustrating one example of the storage state of the packets in the memory 30 when the information (the shared information) indicative of setting to be common among all of the image encoding/decoding devices 501_q1 to 501_n is not used (the related art). In the related art, it is necessary to prepare the initial setup data for every image encoding/decoding device. Therefore, it becomes necessary for the memory 30 to separately and repetitively prepare the areas for storing the packet length L0 corresponding to the common portion also for other image encoding/decoding devices 501_2 to 501_n similarly to the situation that the packet length of the packets for the image encoding/decoding device 501_1 is L1 that is the sum of L0 for a common portion and a unique portion. Accordingly, it becomes necessary for the CPU 20 that sets the initial setup data into the memory 30 to repetitively perform an operation of writing the same initial setup data into respective areas for storing L0 that is being sent repetitively. On the other hand, according to the second embodiment of the present invention, as illustrated in FIG. 5, it is enough to simply prepare single setting as the setting that is common among all of the image encoding/decoding devices by setting "1" for the CBC bit for the setting that is common among the respective encoding/decoding devise and by setting "0" for the CBC bit and setting ID for CID for the setting that is individually performed on each image encoding/decoding device. It is possible to reduce the number of memory areas desirable for the initial setup data in this way. Accordingly, it becomes possible to reduce the load on the CPU 20 that sets the initial setup data into the memory 30.

Third Embodiment

Figure 7:
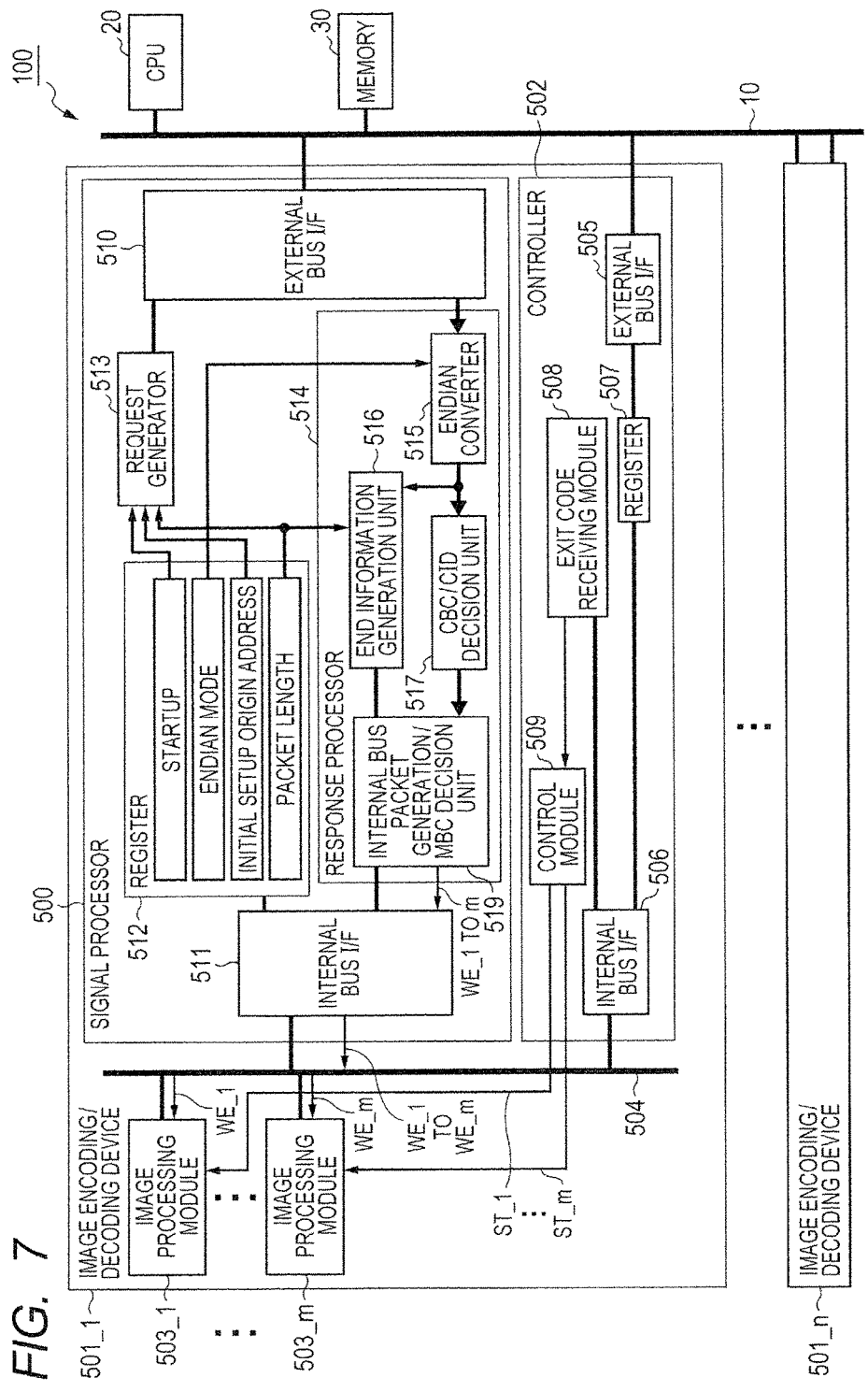
FIG. 7 is a block diagram illustrating one configurational example of a data processing system according to a third embodiment of the present invention.
Figure 8:
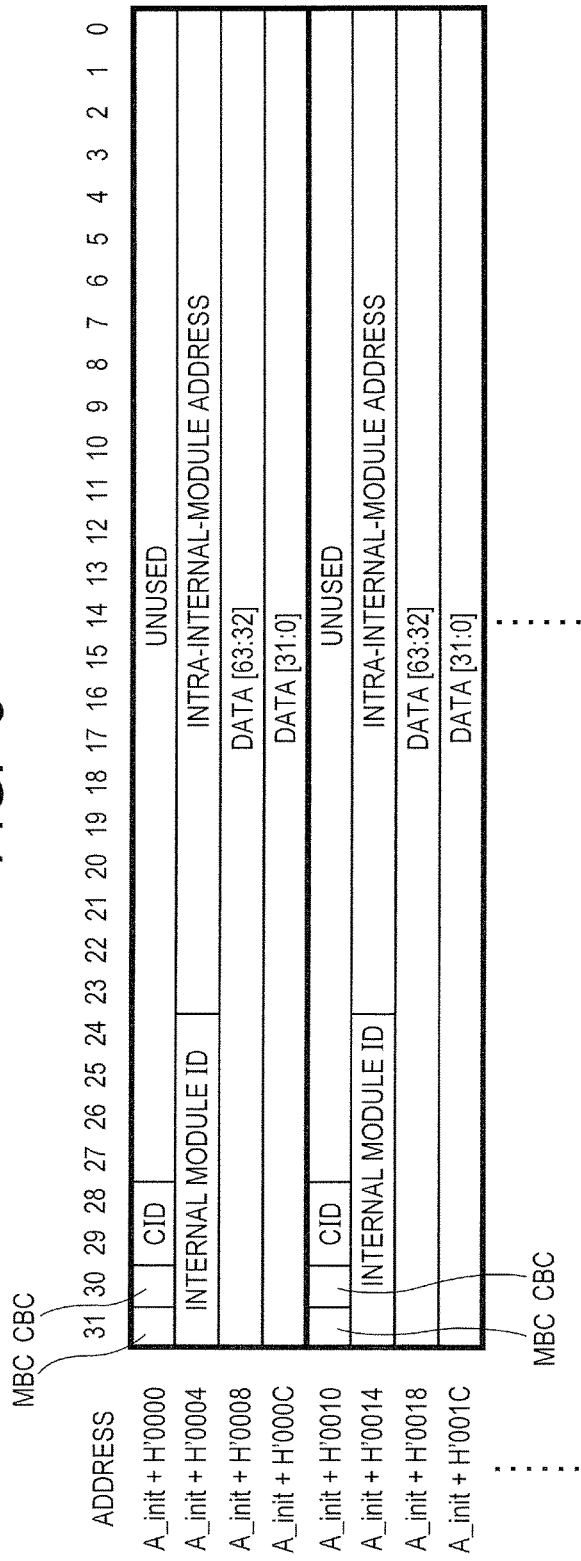
FIG. 8 is an explanatory diagram illustrating one configurational example of packets in the data processing system according to the third embodiment.

FIG. 7 is a block diagram illustrating one configurational example of a data processing system 100 according to the third embodiment. FIG. 8 is an explanatory diagram illustrating one configurational example of packets in the data processing system 100. In the second embodiment, the CBC bit indicative of the setting that is common among all of the image encoding/decoding devices 501_1 to 501_n and the CID bit indicative of the specific image encoding/decoding device are provided in the packets for the initial setup data and the CBC/CID decision unit 517 is installed in the response processor 514 in association with provision of the CBC bit and the CID bit.

In the third embodiment, when there exists the initial setup data that is common also among the image processing modules 503_1 to 503_m, MBC that is a bit indicative of the presence of the common initial setup data is added to the packets. In association with addition of the MBC bit, an MBC decision function is added to the internal bus packet generation unit 518 and the internal bus packet generation unit 518 is replaced with an internal bus packet generation/MBC decision unit 519. Register write enable signals WE_1 to WE_m are independently supplied from the internal bus packet generation/MBC decision unit 519 respectively to the image processing modules 503_1 to 503_m. Other configurations are the same as those of the data processing system 100 according to the second embodiment illustrated in FIG. 3 and therefore description thereon is omitted.

The configurational example of the packets illustrated in FIG. 8 will be described. The packet configuration in the third embodiment is different from the packet configuration in the second embodiment illustrated in FIG. 4 in that MBC that is a feature of the third embodiment is included in the first 32 bit in addition to CBC and CID. MBC is the bit indicative of the packet to be transferred to all of the image processing modules 503_1 to 503_m in the image encoding/decoding device 501. Others are the same as those of the packet configuration in the second embodiment illustrated in FIG. 4 and therefore description thereon is omitted.

An operation of the data processing system 100 according to the third embodiment will be described. Since the data processing system 100 according to the third embodiment operates basically in the same manner as the data processing system 100 according to the second embodiment, only different points will be described. When the CPU 20 generates the packets for the initial setup data that is desirable for the operation of each of the image encoding/decoding devices 501_1 to 501_n, and writes and temporarily stores the packets into the memory 30, in case of the setting that is common among all the image processing modules in each image encoding/decoding device, the MBC bit is set to "1". On the other hand, in case of the setting to be individually performed on each image processing module, the MBC bit is set to "0" and the ID of the setting destination internal module is set to the internal module ID bit. When the read response that has been read out of the memory 30 in accordance with the request from the request generator 513 in the signal processor 500 is input into the response processor 514, the processing that is the same as that in the second embodiment is executed. The internal bus packet generation/MBC decision unit 519 that is installed in place of the internal packet generation unit 518 makes a decision on the MBC bit in the input read response and performs setting of the initial setup data to the image processing modules 503_1 to 503_m in accordance with a result of decision. When "1" is set for the MBC, the initial setup data is sent to all of the image processing modules 503_1 to 503_m. On this occasion, all of the write enable signals WE_1 to WE_m are asserted. The same initial setup data is set into the same intra-internal-module address bit for all of the image processing modules 503_1 to 503_m. Therefore, it is desirable that the same intra-internal-module address be allocated to the registers that store the initial setup data to be at least commonly set into all of the image processing modules 503_1 to 503_m. On the other hand, when the MBC is set to "1", the initial setup data is sent to the address that has been set in the intra-internal-module address bit of the image processing module corresponding to the ID that has been set in the internal module ID bit. In this case, only the corresponding write enable signal is asserted in the write enable signals WE_1 to WE_m.

As described above, the third embodiment features that the MBC bit indicative of the setting that is common among all of the image processing modules is provided in the packets for the initial setup data and the MBC decision function is added to the internal packet generation unit in the response processor 514 in association with provision of the MBC bit, in addition to the features of the above-mentioned second embodiment. Thereby, it becomes possible to reduce the number of memory areas desirable for initial setup data storage also for the data that is common among the image processing modules 503_1 to 503_m in each image encoding/decoding device and therefore it becomes possible to reduce the load on the CPU 20 that sets the initial setup data into the memory 30. This is because the area for storing the initial setup data that is common among all the image processing modules 503_1 to 503_m in one image encoding/decoding device is shared. Further, when the initial setup data is common among all of the image processing modules 503_1 to 503_m in all of the image encoding/decoding devices, it is possible to put the memory areas in the memory 30 into one place by setting CBC and MBC to "1s". Consequently, it becomes possible to further reduce the load on the CPU 20 that sets the initial setup data into the memory 30.

Fourth Embodiment

As described above, in the second embodiment, the example that the initial setup data is common among all of the image encoding/decoding devices has been described and in the third embodiment, the example that the initial setup data is common among all of the image processing modules 503_1 to 503_m in addition to the configuration in the second embodiment has been described. On the other hand, in the fourth embodiment, an example that loading of the CBC bit and the CBC/CID decision unit 517 is not set as antecedent will be described. As described in the first embodiment, when the shared information is included in the packet concerned and the shared information is valid, the payload included in the packet concerned is commonly set into the plurality of registers. Accordingly, the configuration of the first embodiment is also applicable to a case where MBC is set as one example of the shared information and the same initial setup data is set in the register that is common among the resisters of all of the image processing modules 503_1 to 503_m.

Figure 9:
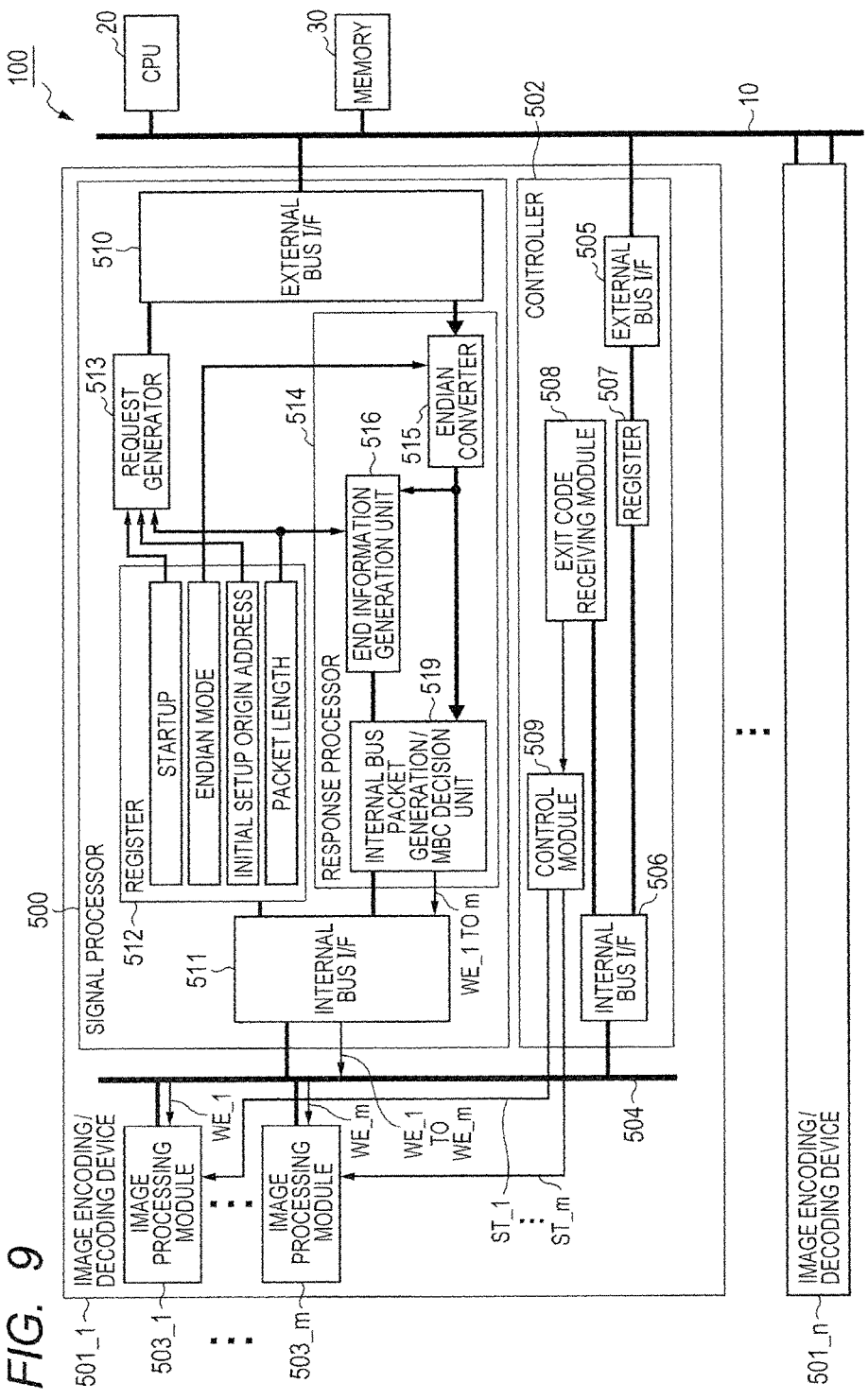
FIG. 9 is a block diagram illustrating one configurational example of a data processing system according to a fourth embodiment of the present invention.

FIG. 9 is a block diagram illustrating one configurational example of a data processing system according to the fourth embodiment. The data processing system according to the fourth embodiment is different from the data processing system 100 according to the third embodiment illustrated in FIG. 7 in that the CBC/CID decision unit 517 is not included. Other configurations are the same as those of the data processing system 100 according to the third embodiment and therefore description thereon is omitted. Incidentally, in the fourth embodiment, provision of the plurality of image encoding/decoding devices 501_1 to 501_n is not demanded. Even the data processing system 100 that includes only one image encoding/decoding device 501_1 has the following advantageous effects.

Figure 10:
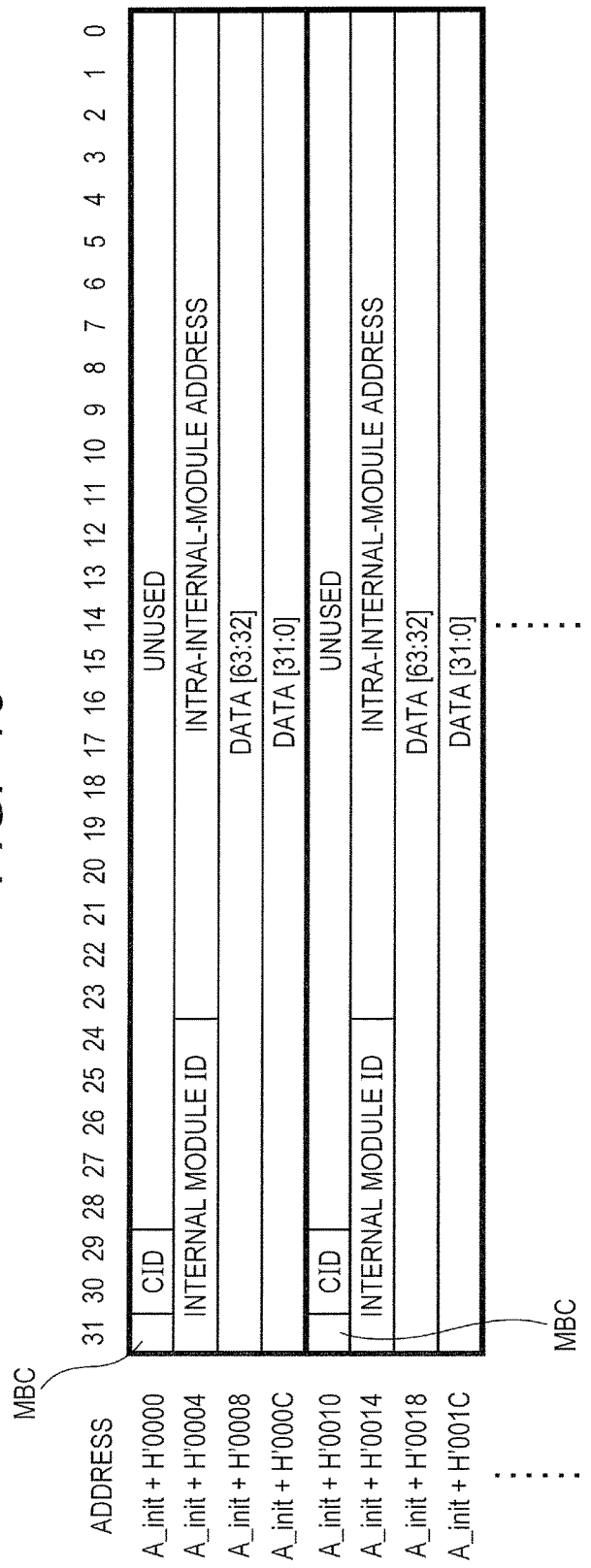
FIG. 10 is an explanatory diagram illustrating one configurational example of packets in the data processing system according to the fourth embodiment.

FIG. 10 is an explanatory diagram illustrating one configurational example of packets in the data processing system 100 according to the fourth embodiment. The configuration of the packets in the fourth embodiment is different from the configuration of the packets in the third embodiment illustrated in FIG. 8 in that the CBC bit is not included. The data processing system 100 according to the fourth embodiment does not make a decision on the CBC bit and makes a decision on the MBC bit in the input read response when CID matches its own ID. When the "1" is set for the MBC, the initial setup data is sent to all of the image processing modules 503_1 to 503_n. On this occasion, all of the write enable signals EW_1 to WE_m are asserted and the same initial setup data is set into the registers to which the same intra-internal-module address bit has been allocated in all of the image processing modules 503_1 to 503_m. On the other hand, when the "0" is set for MBC, the initial setup data is sent to the register to which the address that has been set in the intra-internal-module address bit has been allocated in the image processing module corresponding to the ID that has been set in the internal module ID bit. On this occasion, only the corresponding write enable signal is asserted in the write enable signals WE_1 to WE_m.

Thereby, it becomes possible to reduce the number of the memory areas desirable for initial setup data storage in regard to the data that is common among the respective image processing modules 503_1 to 503_m in one image encoding/decoding device. Accordingly, it becomes possible to reduce the load on the CPU 20 that sets the initial setup data into the memory 30.

Fifth Embodiment

In the second to fourth embodiments, the technologies for reducing the number of the memory areas in the memory 30 for storing the initial setup data that is common among all of the image encoding/decoding devices and/or all of the image processing modules 503_1 to 503_m and thereby reducing the load on the CPU 20 have been described. The fifth embodiment is also applicable to a case where the initial setup data is common among some image encoding/decoding devices in the image encoding/decoding devices 501_1 to 501_n and/or common among some image processing modules in the image processing modules 503_1 to 503_m, not limited to "all" of the devices. In the following, the fifth embodiment will be described.

Figure 11:
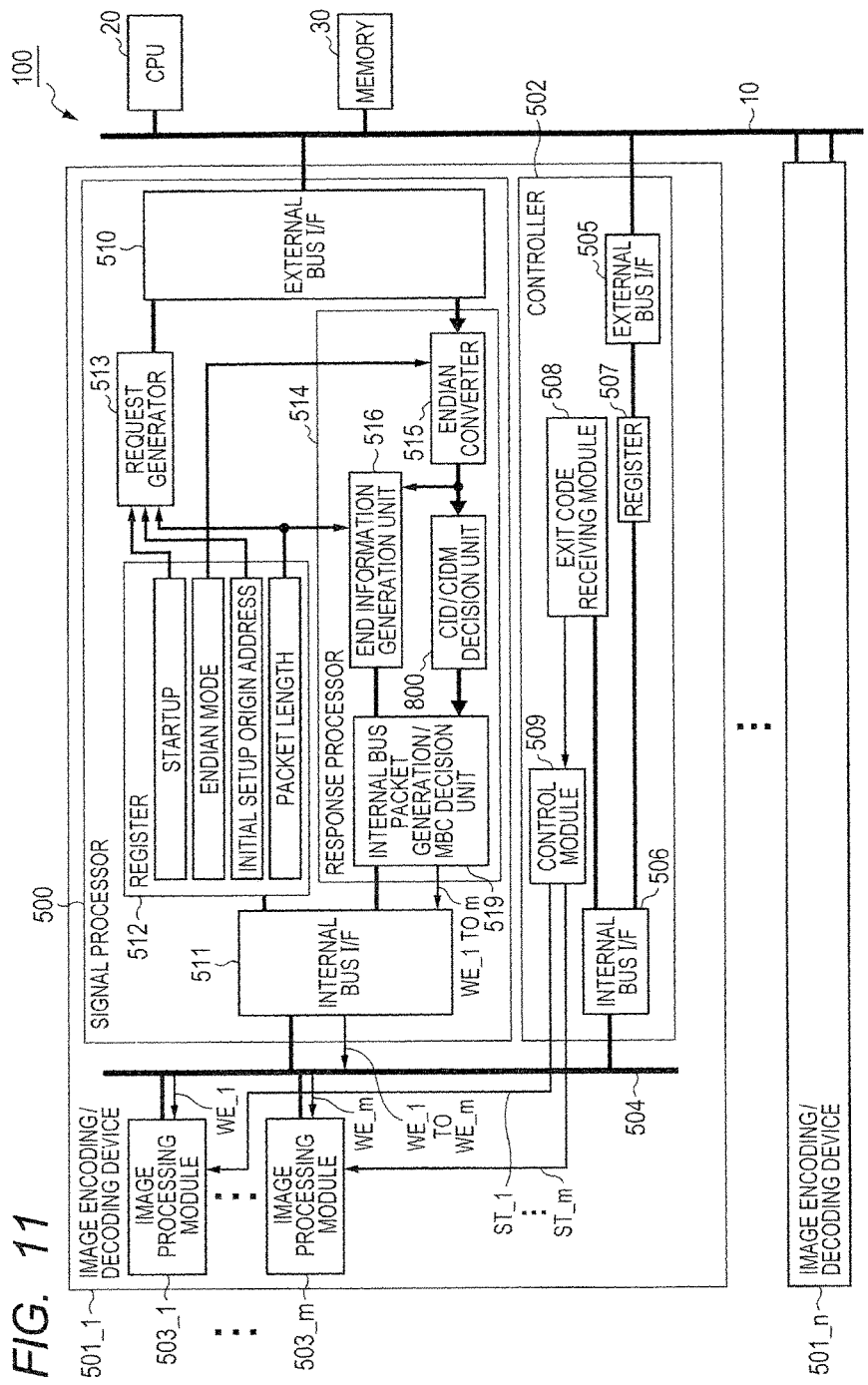
FIG. 11 is a block diagram illustrating one configurational example of a data processing system according to a fifth embodiment of the present invention.

FIG. 11 is a block diagram illustrating one configurational example of a data processing system 100 according to the fifth embodiment. FIG. 12 is an explanatory diagram illustrating one configurational example of packets in the data processing system 100. In the third embodiment, when there exists the initial setup data that is common also among the image processing modules 503_1 to 503_m, MBC that is the bit indicative of the common initial setup data is added to the packets. In association with addition of the MBC bit, the MBC decision function is added to the internal bus packet generation unit 518 and the internal bus packet generation unit 518 is replaced with the internal bus packet generation/MBC decision unit 519. In the fifth embodiment, a CID/CIDM decision unit 800 is provided in addition to the CBC/CID decision unit 517. Other configurations are the same as those of the data processing system 100 according to the third embodiment illustrated in FIG. 7 and therefore description thereon is omitted.

The configuration of the CID/CIDM decision unit 800 will be described. The CID/CIDM decision unit 800 may be configured in the same manner as the transfer circuit 2_1 described with reference to FIG. 2 in the first embodiment. The shared information, the destination identifier, the destination address, and the payload in FIG. 2 respectively correspond to CIDM, CID, the internal module ID and the intra-internal-module address, and data [63:0]. CID and the ID unique to the image encoding/decoding device are ANDed with CIDM that is the mask bit by bit and the ANDed value is input into the 2-bit comparison circuit 8_1. When the comparison result indicates matching between the identifiers, the initial setup data that is the payload is transferred to the registers of the image processing modules 503_1 to 503_m of the image encoding/decoding device concerned. Here, that the number of bits has been defined as 2 is merely one example and the number of bits may be optionally changed. In addition, as the mask, the OR operation may be used in place of the AND operation. Whether the positive logic or the negative logic is adopted is optional. It becomes possible to indicate that the plurality of image encoding/decoding devices are the targets for setting the common initial setup data by excluding some bits in CID from the target for comparison with the unique ID of the data encoding/decoding device in this way. It is possible to appropriately change the way of giving mask information in accordance with the degree of freedom when designating the target image encoding/decoding device. For example, when every four bits are allocated to CID and CIDM and every low-order two bits are masked, it is possible to set the same initial setup data for every four image encoding/decoding devices. On this occasion, the internal bus packet generation/MBC decision unit 519 transfers the initial setup data that is the payload to all of the image processing modules by the same operation as that described in the third embodiment when one image processing module or MBC corresponding to the internal module ID is "1".

The configurational example of the packets illustrated in FIG. 12 will be described. The packet configuration in the fifth embodiment is different from the packet configuration in the third embodiment illustrate in FIG. 8 in that CIDM that is the mask bit for CID is stored into the first 35 bits in place of CBC. The packet configuration in the fifth embodiment is the same as the packet configuration in the third embodiment illustrated in FIG. 8 in other respects and therefor description thereon is omitted.

An operation of the data processing system 100 according to the fifth embodiment will be described. Since the data processing system 100 according to the fifth embodiment operates basically in the same manner as the data processing system 100 according to the third embodiment, only different points will be described. The CPU 20 generates the packets for the initial setup data desirable for the operation of the image encoding/decoding device 501 in accordance with the format as illustrated in FIG. 12, and writes and temporarily stores the packets into the memory 30. On this occasion, when the setup value is common among the plurality of image encoding/decoding devices, the image encoding/decoding devices for which the same initial setup data is to be set are designated by using the bits of CID and CIDM. As a designation method, for example, the bit of CIDM is set to "2'b01" and the bit of CID is set to "2'b01". Here, "2'b" is a notation indicative of two binary digits. The bit 1 of CID is masked with "0" by setting the bit 1 of CIDM to "0". Thereby, the bit 1 of CID is handled almost as a wild card and the initial setup data is set to the image encoding/decoding devices that are "2'b01" and "2'b011" in CID. When the initial setup data is to be individually set to each image encoding/decoding device, "1s" are set for all of the bits of CIDM and the ID of the setting destination image encoding/decoding device is stored into the CID bit. In addition, in case of the setting that is common among all of the image processing modules 503_1 to 503_m in the image encoding/decoding device 501, the MBC bit is set to "1" similarly to the third embodiment. On the other hand, in case of the setting to be individually performed on each of the image processing modules 503_1 to 503_m, "7 0" is set for the MBC bit and the ID of the internal module of the setting destination device is set into the internal module ID bit.

The image encoding/decoding device reads the packets for the initial setup data out of the memory 30 by performing the same operation as that in the data processing system 100 in the third embodiment and decides whether the packets are addressed to its own device by the CID/CIDM decision unit 800. For example, when CID&CIDM (bit-by-bit AND of CID and CIDMI) is equal to its own CID&CIDM (bit-by-bit AND of its own CID and CIDMI), the image encoding/decoding device decides that the packets are addressed to its own device and transfers the initial setup data to its own image processing modules. As in the above-mentioned example, when CIDM is "2'b01", CID is "2'b01", and its own ID is "2'b01", CID&CIDM=2'b01 and its own ID&CIDM=2'b01 and the both are equal to each other, and therefore it is decided that the packets are addressed to its own device. In addition, when CIDM is "2'b01", CID is "2'b01", and its own ID is "2'b10", CID&CIDM=2'b01 and its own ID&CIDM=2'b00 and the values of the both are different from each other, and therefore it is decided that the packets are not addressed to its own device. The read response that it is decided that the packets are addressed to its own device is transferred to the internal bus packet generation/MBC decision unit 519.

The internal bus packet generation/MBC decision unit 519 makes a decision on the MBC bit in the read response that has been input similarly to that in the third embodiment and performs initial setup data setting on the image processing modules 503_1 to 503_m in accordance with a result of decision. When "1" is set for the MBC, the initial setup data is sent to all of the image processing modules 503_1 to 503_m. On this occasion, all of the write enable signals WE_1 to WE_m are asserted. The same initial setup data is set into the same intra-internal-modules address bit in all of the image processing modules 503_1 to 503_m. On the other hand, when "0" is set for MBC, the initial setup data is sent to the address that has been set in the intra-internal-module address bit of the image processing module corresponding to the ID that has been set in the internal module ID bit. In this case, only the corresponding write enable signal is asserted in the write enable signals WE_1 to WE_m.

Thereby, it becomes possible to designate the setting for one image encoding/decoding device or the setting that is common among all of the image encoding/decoding devices and it becomes also possible to designate the setting that is common among some image encoding/decoding devices, such as, for example, the setting for the image encoding/decoding devices having odd-numbered CIDs, the setting for the image encoding/decoding devices having CIDs of multiples of four and so forth. It becomes possible to impart the degree of freedom to designation of the target image encoding/decoding devices that the same initial setup data is to be set in this way in comparison with the second to fourth embodiments. In addition, although in the fifth embodiment, the example that MBC is additionally provided has been described, decision on MBC may be omitted similarly to the second embodiment. In addition, it is also possible to apply the mask as the shared information to the image processing modules 503_1 to 503_m with no decision on CID similarly to the fourth embodiment. In this case, a mask bit corresponding to the internal module ID is included in the packets and the MBC decision function of the internal bus packet generation/MBC decision unit 519 in the third and fourth embodiments is replaced with the function of the circuit similarly to that in FIG. 2.

Sixth Embodiment

In the second to fifth embodiment, technologies that the number of memory areas in the memory 30 for storing the initial setup data that is common among all or some of the plurality of image encoding/decoding devices 501_1 to 501_n and/or is common among all or some of the plurality of image processing modules 503_1 to 503_m in each image encoding/decoding device is reduced so as to reduce the load on the CPU 20 have been described. One example that CID and the internal module ID are regarded as high-order bits in the internal address by further developing the above mentioned technologies will be described. In addition, in the internal address, an address mask bit to be used for masking an optional bit is provided.

FIG. 13 is an explanatory diagram illustrating one configurational example of an address of the internal bus in a data processing system according to the sixth embodiment. In the 32-bit address of the internal bus 504, high-order two bits [31:30] are allocated to CID, the following four bits in the address are allocated to the internal module ID, and the remaining 26 bits [25:0] are allocated to the intra-internal-module address. Since the internal bus 504 is separated for each of the image encoding/decoding devices 501_1 to 501_n, it may not necessary to define a united address space originally. However, the address spaces for the plurality of image encoding/decoding devices 501_1 to 501_n are configured to be discriminated from one another by the CID to which the high-order two bits are allocated. Two-bit allocation to CID as mentioned above is limited to a case where the number (parallelism) of the image encoding/decoding devices is 4 (n≤4) at a maximum.

FIG. 14 is an explanatory diagram illustrating one configurational example of packets in the above-mentioned situation. First 32 bits are used as the address mask bits and second 32 bits are used as the internal address. Succeeding 64 bits are used as bits for storing the initial setup data similarly to the second to fifth embodiments.

Figure 15:
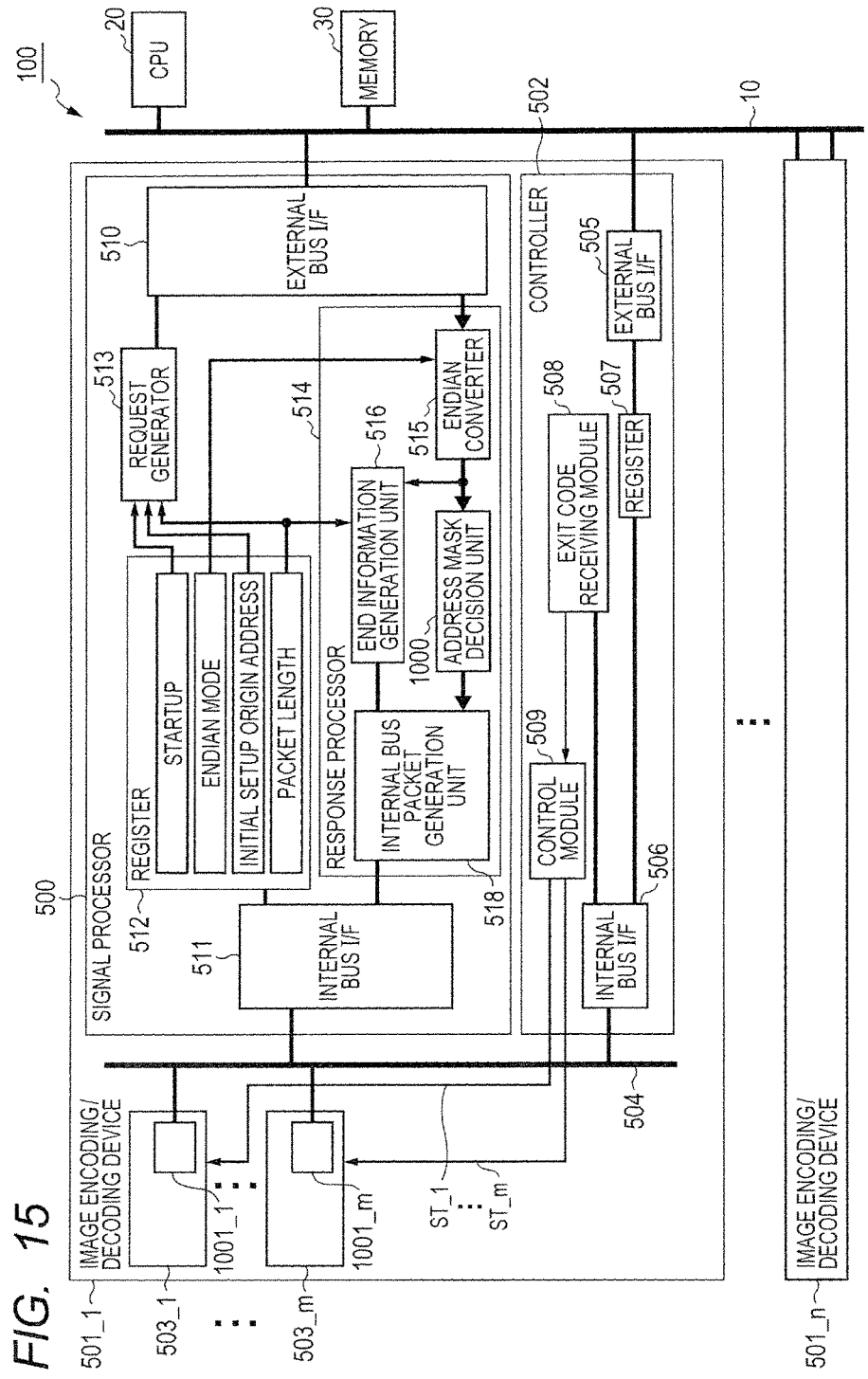
FIG. 15 is a block diagram illustrating one configurational example of the data processing system according to the sixth embodiment.

FIG. 15 is a block diagram illustrating one configurational example of a data processing system 100 according to the sixth embodiment. The data processing system 100 according to the sixth embodiment is different from the data processing system 100 according to the second embodiment illustrated in FIG. 3 in that an address mask decision unit (a CID unit) 1000 and address mask decision units (internal module ID units) 1001_1 to 1001_m on the sides of the image processing modules 503_1 to 503_m are provided in place of the CBC/CID decision unit 517. Other configurations are the same as those of the data processing system 100 according to the second embodiment that has been described with reference to FIG. 3 and therefore description thereon is omitted. The address mask decision unit (the CID unit) 1000 is installed in the response processor 514 and the address mask decision units (the internal module ID units) 1001_1 to 1001_m are respectively installed in the image processing modules 503_1 to 503_m.

Figure 16:
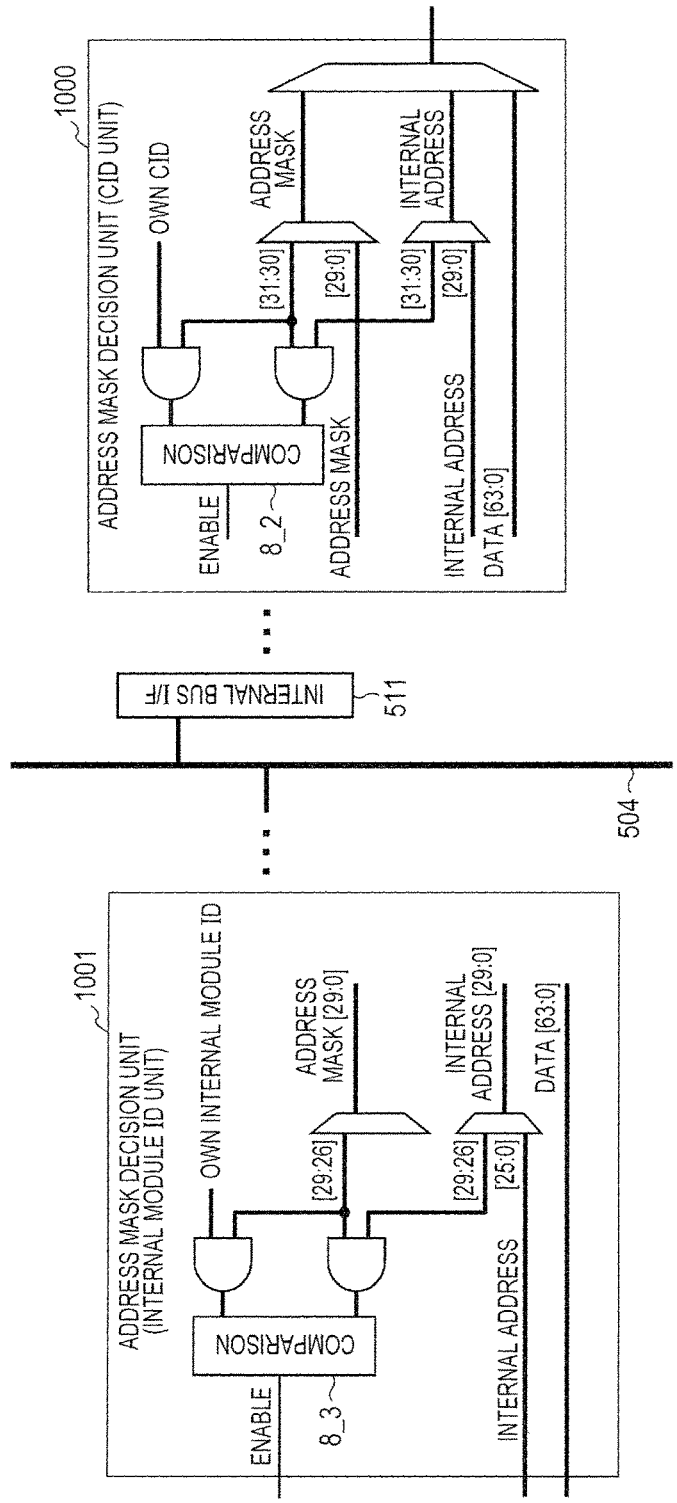
FIG. 16 is a block diagram schematically illustrating one configurational example of address mask decision units of a CID unit and an internal module ID unit.

FIG. 16 is a block diagram schematically illustrating one configurational example of the address mask decision units for the CID unit and the internal module ID unit. In the address mask decision unit (the CID unit) 1000, the read response that has been readout of the memory 30 in accordance with the request from the request generator 513 in the signal processor 500 is subjected to the endian conversion processing described in the second embodiment and is then input. The read response is separated into the address mask and the internal address. The high-order two bits of the address mask function as the mask for CID. The address mask decision unit (the CID unit) 1000 gets AND between the high-order two bits [31:30] of the address mask and its own ID, and gets AND between the high-order two bit [31:30] of the address mask and the high-order two bits [31:30] of the internal address included in the read response bit by bit, and the address mask decision unit (the CID unit) 1000 includes a 2-bit comparison circuit 8_2 that compares results of the AND operations. The address mask decision unit (the CID unit) 1000 outputs an enable signal indicative of a result of comparison, the low-order 30 bits [29:0] in the address mask, the low-order 30 bits [29:0] in the internal address and the payload data [63:0] from the internal bus interface (I/F) 511 to the internal bus 504. Thereby, the function that is the same as the CIDM function described in the fifth embodiment is implemented.

The address mask decision unit (the internal module ID unit) 1001 in FIG. 16 is one configurational example of the address mask decision units (the internal module ID units) 1001_1 to 1001_m on the sides of the respective image processing modules 503_1 to 503_m. The high-order four bits in the address mask [29:0] function as the mask for the internal module ID. The high-order four bits in the internal address [29:0] configure the ID of the target internal module into which the payload data [63:0] is to be written and the remaining 26 bits function as the internal address. The address mask decision unit (the internal module ID unit) 1001 includes a 4-bit comparison circuit 8_3 that gets AND of four bits [29:26] of the address mask and four bits [29:26] of the internal address included in its own ID and the read response bit by bit and compares results of the AND operations. An output (a result of comparison) from the comparison circuit 8_3 is a write enable signal for the registers in the corresponding image processing modules 503_q1 to 503_m. Thereby, it is possible to also control the mask for the internal module ID unit in the same address space as that of the mask for CID.

An operation of the data processing system 100 according to the sixth embodiment will be described. The CPU 20 generates the packets for the initial setup data desirable for the operation of the image encoding/decoding device 501 in accordance with the format as illustrated in FIG. 14 and writes and temporarily stores the packets into the memory 30. When generating the packets for the initial setup data, in case of the setup value that is common among the plurality of image encoding/decoding devices, the image encoding/decoding device for setting the initial setup data is designated by using the bits of the address mask. As the designation method, for example, bits [31:30] of the address mask are set to "2'b00" and bits [20:0] of the address mask are all set to "1s". It is indicated that the bits [31:30] of the internal address indicative of the ID of the image encoding/decoding device are masked with "2'b00" by setting the bits [31:30] of the address mask to "2'b00". Thereby, the bits [31:30] of the internal address are handled almost as the wild cards, and the bits [31:30] of the internal address are set to "2'b00", "2'b01", "2'b10" and "2'b11", that is, the initial setup data included in the payload data [63:0] is set for the internal address that the values set for the bits [29:0] of the internal address in all of the image encoding/decoding devices indicate. When the initial setup data is to be individually set for each image encoding/decoding device, "1s" (2'b11) are set for all bits of the bits [31:30] of the address mask and the ID of the setting destination image encoding/decoding device is stored into the bits [31:30] of the internal address. As described above, the image encoding/decoding device 501 reads the packets for the initial setup data out of the memory 30 by the same operation as that described in the second embodiment and decides whether the packets are addressed to the device itself by the address mask decision unit 1000. Further, in the plurality of image processing modules 503_1 to 503_*m*, some image processing modules for which the common initial setup data is to be set are designated and the initial setup data is set into the designated image processing modules by the address mask decision unit 1001.

Figure 17:
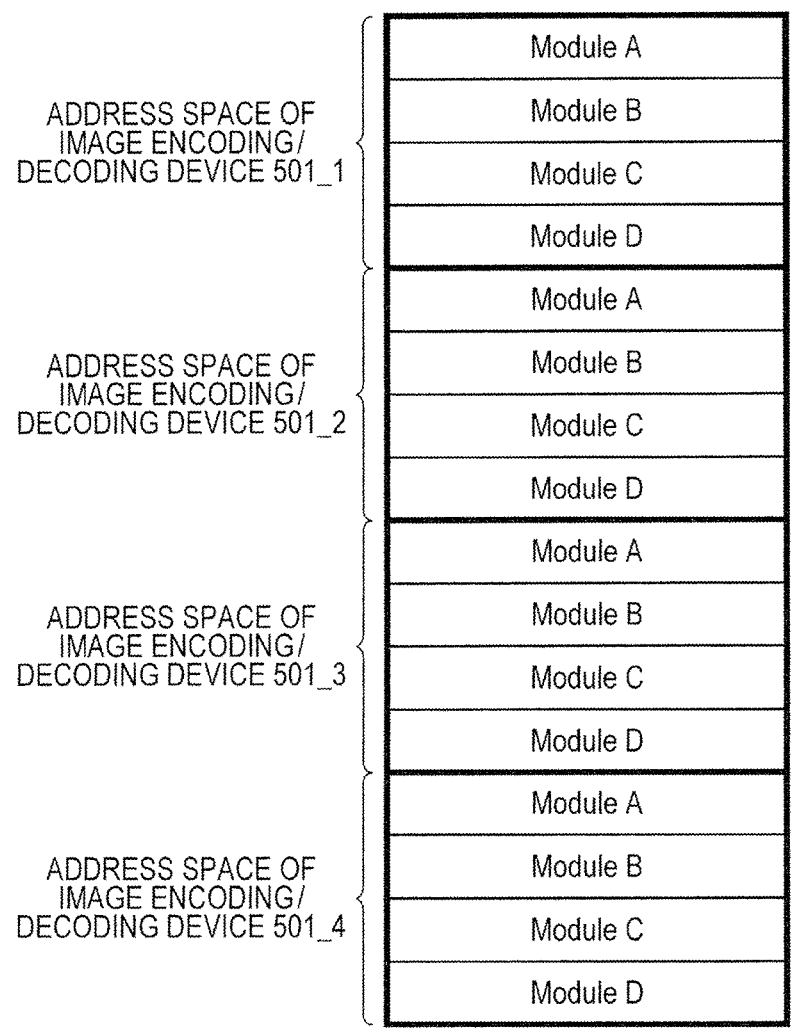
FIG. 17 is an explanatory diagram illustrating one configurational example of an address of an internal bus.

In the sixth embodiment, it becomes possible to mask an optional bit of the address with the address mask bit provided in the packets for the initial setup data. Thereby, when there exist repetitively prepared address spaces, it becomes possible to mask the address spaces by optional grouping. For example, as illustrated in FIG. 17, when there exist such repetitively prepared address spaces that the addresses of Module A to Module D are repeated for every image encoding/decoding device, such designation that the initial setup data is set for Module C and Module D of the image encoding/decoding devices 501_1 and 503_3 becomes possible. Description will be made by giving a specific example. For example, in the bits of the internal address in FIG. 14, the bits [31:30] are bits indicative of the ID of the image encoding/decoding device concerned and values 0 to 3 respectively correspond to the image encoding/decoding devices 501_1 to 501_4. In addition, it is assumed that the bits [29:28] are bits indicative of the ID of the internal module and "2'b00", "2'b01", "2'b10" and "2'b11" respectively denote Module A, Module B, Module C and Module D. It is possible to transfer the packets for the initial setup data to the image encoding/decoding devices whose IDs are "2'b00" and "2'b10", that is, to the image encoding/decoding devices 501_1 and 501_3 by setting "2'b01" to the bits [31:30] of the address mask and setting "2'b00" to the bits [31:30] of the internal address. In addition, it becomes possible to set the initial setup data to the modules that the bits [29:28] of the internal address are "2'b10" and "2'b11", that is, Module C and Module D by setting "2'b10" to the bits [29:28] of the address mask and by setting 2'b11 to the bits [29:28] of the internal address.

As described above, even when the data processing devices (the image encoding/decoding devices 501_1 to 501_*n*) each includes the plurality of data processing modules (the image processing modules 503_1 to 503_*m*), it is possible to share the initial setup data among only some of the plurality of data processing devices and/or some of the plurality of the data processing modules. Accordingly, it is possible to improve the degree of freedom in comparison with a simplest case where each of the shared information and the module shared information is set as a 1-bit flag.

Seventh Embodiment

Figure 18:
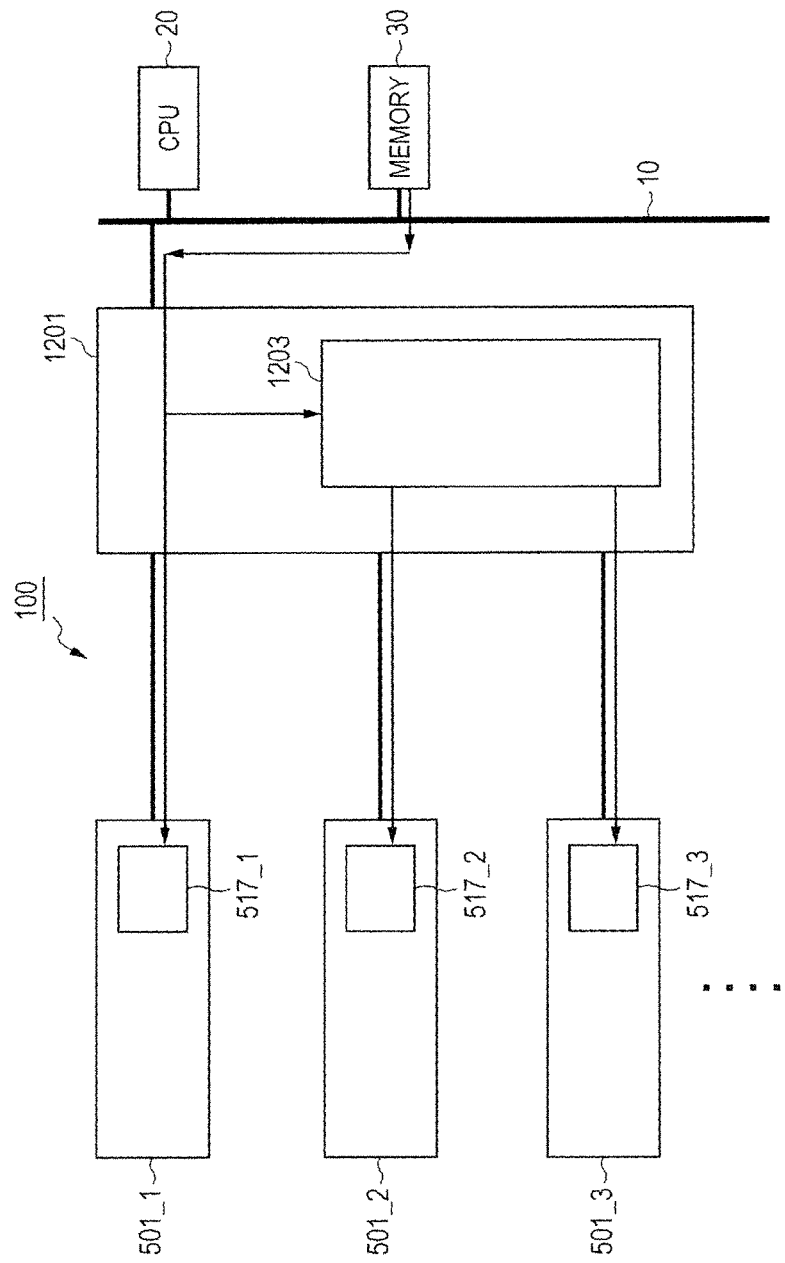
FIG. 18 is a block diagram illustrating one configurational example of a data processing system according to a seventh embodiment of the present invention.

FIG. 18 is a block diagram illustrating one configurational example of a data processing system 100 according to the seventh embodiment. The data processing system 100 according to the seventh embodiment illustrated in FIG. 18 includes an initial setup data cache 1201 that includes a cache memory 1203 that stores the initial setup data between the bus 10 to which the CPU 20 and the memory 30 are coupled and the plurality of the image encoding/decoding devices 501_1 to 501_*n*. The plurality of image encoding/decoding devices 501_1 to 501_*n* are coupled to the initial setup data cache 1201. The image encoding/decoding devices 501_1 to 501_*n* may have any of forms described in the second to sixth embodiments.

An operation of the data processing system 100 according to the seventh embodiment will be described.

The CPU 20 writes the packets for the initial setup data desirable for the operation of each of the image encoding/decoding devices 501_1 to 501_*n* into the memory 30, thereafter sets information desirable for transfer of the initial setup data into the register 512 (not illustrated) in the signal processor 500 (not illustrated) via the controller 502 (not illustrated) and starts up the respective image encoding/decoding devices 501_1 to 501_*n*. The image encoding/decoding devices 501_1 to 501_*n* respectively output the read requests from the request generators 513_1 to 513_*n* (not illustrated) to the initial setup data cache 1201 in accordance with the above-mentioned start-up operation.

According to the seventh embodiment, the read response (the packets including the initial setup data) that one image encoding/decoding device has transferred from the memory 30 is transferred to the image encoding/decoding device itself and is stored into the cache memory 1203 in the initial setup data cache 1201. When the read request for the packets has been made from another image encoding/decoding device, whether the corresponding read response is cached in the cache memory 1203 in the initial setup data cache 1201 is decided and thereafter when the corresponding read response is cached in the cache memory 1203, the initial setup data is transferred from the cache memory 1203 to the image encoding/decoding device concerned. For example, when the image encoding/decoding device 501_1 has transferred the initial setup data from the memory 30, the initial setup data is stored into the cache memory 1203 in the initial setup data cache 1201 and is transferred to the image encoding/decoding device 501_1.

Here, although the image encoding/decoding devices 501_1 to 501_*n* may be configured as any of the image encoding/decoding devices described in the second to sixth embodiment, it is supposed that the image encoding/decoding devices 501_1 to 501_*n* respectively include CBC/CID decision units 517_1 to 517_*n*. In addition, it is supposed that the packet that the image encoding/decoding device 501_1 requests is the packet that CBC is set and CID indicates the image encoding/decoding device 501_1. In this situation, when it is supposed that firstly the image encoding/decoding device 501_1 has requested the packets, the initial setup data included in the packets will be transferred to the image encoding/decoding device 501_1 and will be stored into the initial setup data cache 1201. Then, when other image encoding/decoding devices 501_2 to 501_*n* request the packets, in a case the CBC is set, the initial setup start address that is obtained at that time has the same value as the packets that the image encoding/decoding device 501_1 has firstly requested and therefore the cache hit occurs and the packets are supplied from the cache memory 1203 in the initial setup data cache 1201 to other image encoding/decoding devices 501_2 to 501_*n* that have requested the packets. On this occasion, although CID indicative of the image encoding/decoding device 501_1 is included in the packets, CBC is set and therefore the same initial setup data is also transferred to other image encoding/decoding devices 501_2 to 501_*n* regardless of the value of CID. When the image encoding/decoding devices 501_2 to 501_*n* perform reading of the initial setup data that is the same as the initial setup data that the image encoding/decoding device 501_1 has transferred before, the requested initial setup data is already stored in the cache memory 1203 in the initial setup data cache 1201. Therefore, the initial setup data is read out of the cache memory 1203 in the initial setup data cache 1201 with no access to the memory 30 and is transferred to the initial setup registers of the image encoding/decoding devices 501_2 to 501_n via the CBC/CID decision units 517_2 to 517_n for the respective image encoding/decoding devices 501_2 to 501_n.

Internal bus packet generation/MBC decision units 519_1 to 519_n or address mask decision units 1000_1 to 1000_n may be included in place of the CBC/CID decision units 517_1 to 517_n.

Thereby, it becomes possible to reduce the amount of the initial setup data to be accessed to the memory 30 to about 1/n in maximum in comparison with the second to sixth embodiments.

Eighth Embodiment

The CBC/CID decision units 517_1 to 517_n, the internal bus packet generation/MBC decision units 519_1 to 519_n or the address mask decision units 1000_1 to 1000_n may be installed anywhere in the data processing system 100.

Figure 19:
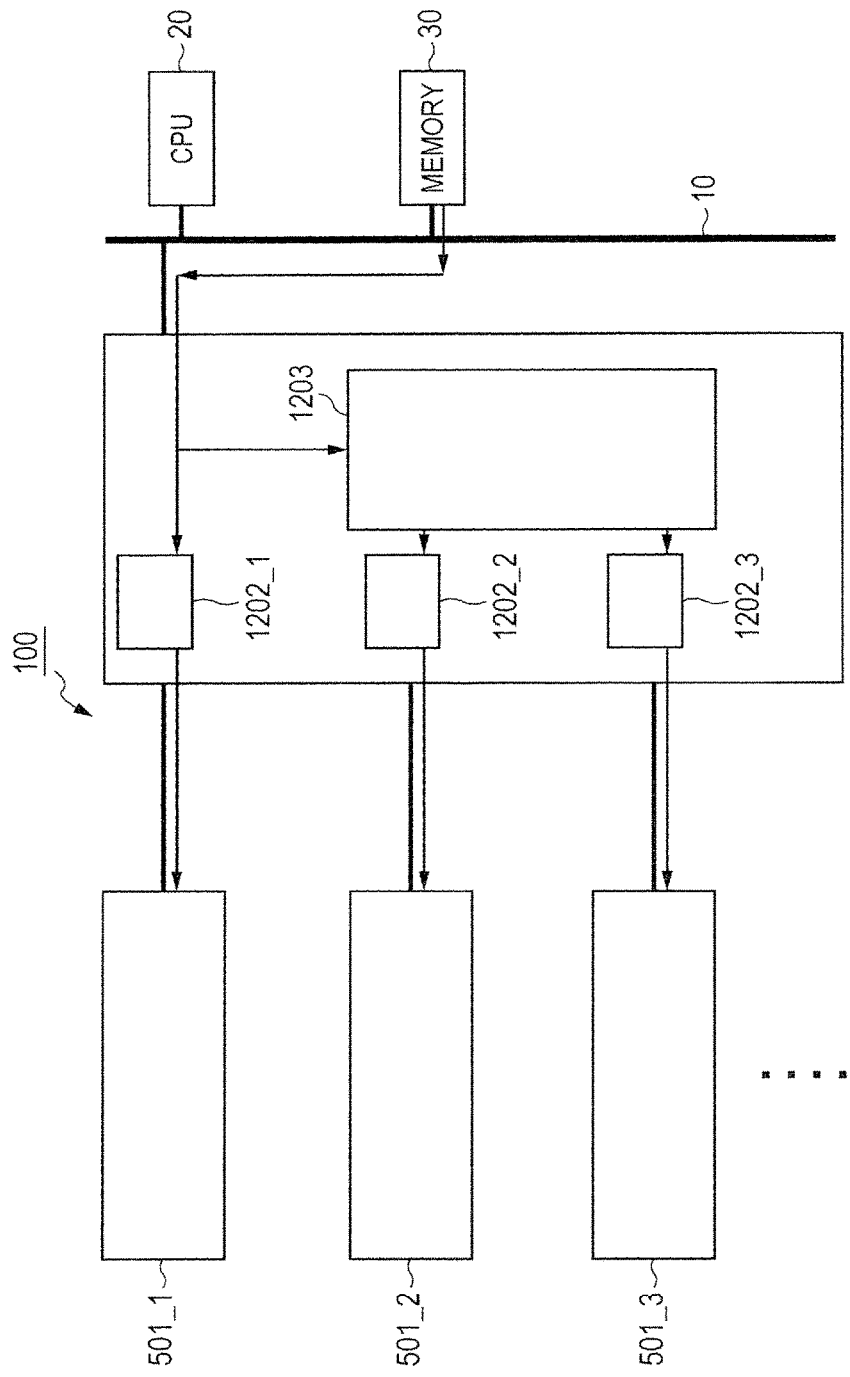
FIG. 19 is a block diagram illustrating one configurational example of a data processing system according to an eighth embodiment of the present invention.

FIG. 19 is a block diagram illustrating one configurational example of a data processing system according to the eighth embodiment. In the eighth embodiment, a destination decision unit 1202 that corresponds to the CBC/CID decision units 517_1 to 517_n, the internal bus packet generation/MBC decision units 519_1 to 519_n or the address mask decision units 1000_1 to 1000_n is installed in the initial setup data cache 1201.

It becomes possible to reduce the amount of the initial setup data to be accessed to the memory 30 to about 1/n in maximum similarly to the seventh embodiment in comparison with the second to sixth embodiments.

Ninth Embodiment

Figure 20:
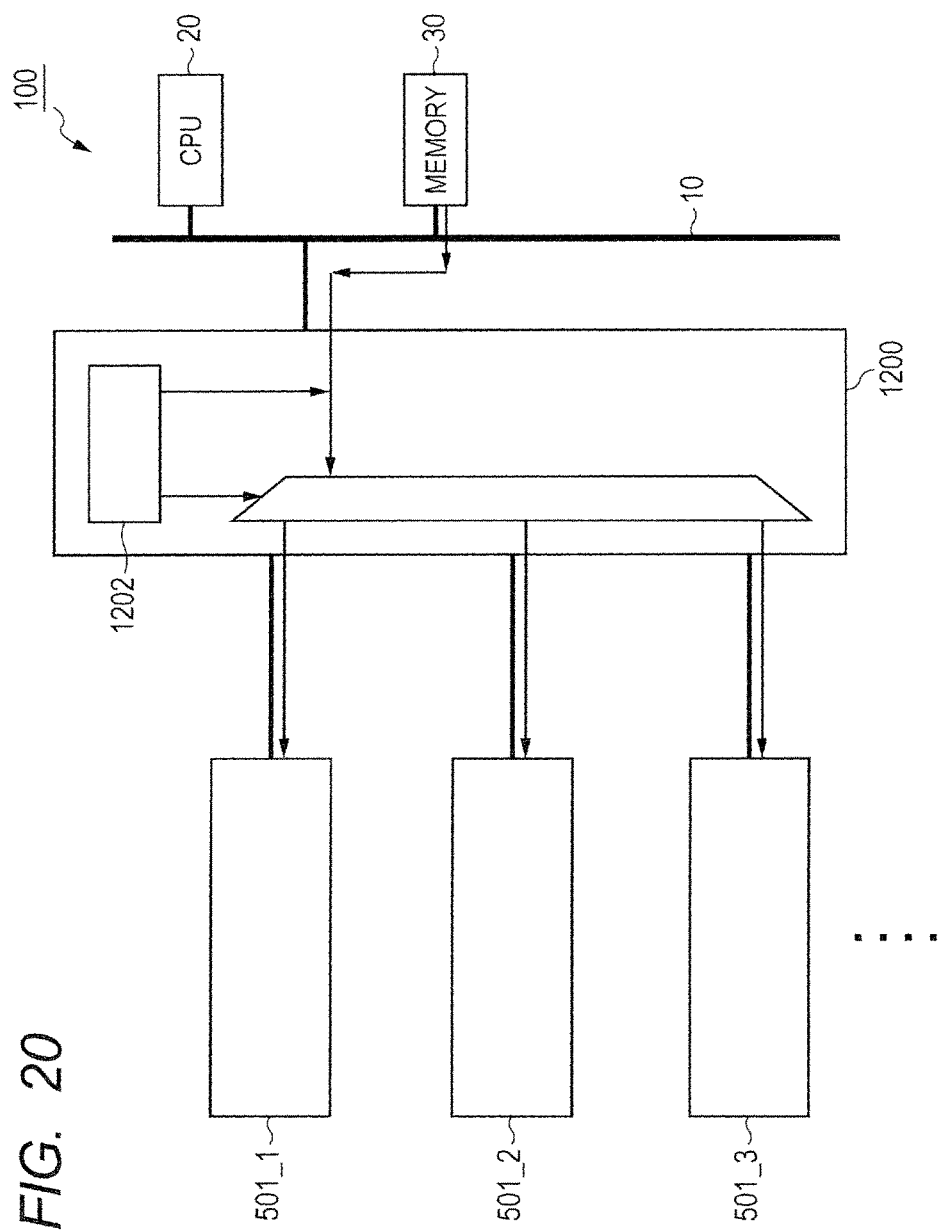
FIG. 20 is a block diagram illustrating one configurational example of a data processing system according to a ninth embodiment of the present invention.

FIG. 20 is a block diagram illustrating one configurational example of a data processing system according to the ninth embodiment. The data processing system illustrated in FIG. 20 includes an initial setup data read module 1200 that performs reading of the initial setup data commonly for the plurality of image encoding/decoding devices 501_1 to 501_n. The image encoding/decoding devices 501_1 to 501_n may have any of the forms described in the second to sixth embodiments. The initial setup data read module 1200 includes the destination decision unit 1202 that corresponds to the CBC/CID decision unit 517, the CID/CIDM decision unit 800 or the address mask decision unit 1000. The destination decision unit 1202 decides the destination of the packets by using any of the methods described in the second to sixth embodiments and transfers the packets to the target image encoding/decoding device.

An operation of the data processing system 100 according to the ninth embodiment will be described.

The CPU 20 writes the packets for the initial setup data desirable for the operations of the respective image encoding/decoding devices 501_1 to 501_n into the memory 30, and thereafter sets the information desirable for transfer of the initial setup data into the register 512 (not illustrated) in the signal processor 500 (not illustrated) via the controller 502 (not illustrated) for controlling the respective image encoding/decoding devices 501_1 to 501_n and starts up the respective image encoding/decoding devices 501_1 to 501_n. The read request that has been output from each of the image encoding/decoding devices 501_1 to 501_n in accordance with the above-mentioned start-up operation is input into the not illustrated bus arbitration circuit or initial setup data read module, undergoes arbitration and is supplied to the memory 30 via the bus 10. The read response that has been read out in response to the read request is input into the initial setup data read module 1200 and the destination of the read response is decided by the destination decision unit 1202.

For example, when the destination decision unit 1202 has the same function as the CBC/CID decision unit 517, the destination decision unit 1202 decides whether the packets are to be transferred to all of the image encoding/decoding devices 501_1 to 501_n or to one image encoding/decoding device that is designated by CID in accordance with presence/absence of CBC and transfers the packets in accordance with a result of decision. The read request that has become useless due to issuance of the read responses to the read requests issued from other image encoding/decoding devices may be invalidated or cancelled at that point of time or the configuration may be made so as to sequentially handle the read requests from the image encoding/decoding devices 501_1 to 501_n and the read responses so as not to issue the read request that has become useless due to the ever issued read responses. In addition, the register, the request generator and so forth may be arranged not in each of the image encoding/decoding devices 501_1 to 501_n but in the initial setup data read module 1200 so as to configure that the initial setup data read module 1200 issues the read request. The same also applies to a case where the destination decision unit 1202 has the same function as the CID/CIDM decision unit 800 or the address mask decision unit 1000.

In the second to sixth embodiments, since the signal processors 500_1 to 500_n that perform initial setup data reading are arranged in the respective image encoding/decoding devices 501_1 to 501_n, each data encoding/decoding device is structured to read the initial setup data. In other words, even in case of the initial setup data that is common among the respective image encoding/decoding devices, the data is read the number of times corresponding to the number of the image encoding/decoding devices installed. In the ninth embodiment, owing to arrangement of the commonly used initial setup data read module, it becomes possible to read the initial setup data stored in the memory 30 and to distribute the initial setup data to the respective image encoding/decoding devices in accordance with CBC/CID set for each image encoding/decoding device. It is enough to read the initial setup data only once similarly to the seventh and eighth embodiments. Thereby, it is possible to reduce a band width of the bus 10 and it is also possible to make a circuit scale small because it is enough to prepare only one initial setup data read module for the plurality of image encoding/decoding devices.

Although, in the foregoing, the invention that has been made by the inventors and others of the present invention has been specifically described on the basis of the embodiments, it goes without saying that the present invention is not limited to the embodiments described so far and may be varied in a variety of ways within a scope not deviating from the gist thereof.

For example, block division illustrated in the block diagrams is merely one example and such alteration may be appropriately and optionally made that one block is implemented as another block by altering such that some or all of functions in one block are integrated with functions of other blocks. In addition, in the block diagrams each including the logical circuit illustrated as one example, whether the logical circuit concerned is configured on the basis of the positive logic or the negative logic and/or whether the same function is implemented by mutually different logical circuits are optionally changeable matters.

What is claimed is:

1. A data processing system comprising:
a plurality of data processing devices that respectively include a plurality of setup registers to execute data processing based on setup data that has been set commonly into at least some of the setup registers in parallel with one another,
wherein the data processing devices each includes its own unique identifier,
wherein the data processing devices each includes a transfer circuit that receives a plurality of packets that distributedly include the setup data and transfers the received packets to the setup registers,
wherein the packets include a payload, shared information, a destination identifier and a destination address, and
wherein, when the packets have been received, the transfer circuit
sets the payload concerned to the setup register corresponding to the destination address, when the shared information included in the packet concerned indicates that the payload included in the packet concerned is the setup data to be commonly set into at least some data processing devices including its own data processing device in the data processing devices, and
sets the payload concerned to the setup register corresponding to the destination address on condition that the destination identifier matches its own identifier, when the shared information included in the packet concerned indicates that the payload included in the packet concerned is not the setup data to be commonly set into the data processing devices.

2. The data processing system according to claim 1, further comprising:
a bus to which the data processing devices are coupled and to which a memory that the packets are stored and a central processing unit are respectively allowed to be coupled,
wherein the data processing device further includes a packet setup register and a packet request generation circuit,
wherein the packet setup register is a register configured to retain packet storage information on the basis of which the packets that include the setup data corresponding to its own data processing device is stored into the memory by being supplied from the central processing unit,
wherein the packet request generation circuit is a circuit configured to generate a request signal to the bus used for reading the packets out of the memory, on the basis of the packet storage information stored in the packet setup register,
wherein the transfer circuit detects that the all packets including the setup data corresponding to its own data processing device have been received in response to the request signal as setup end information, and
wherein the data processing device starts data processing based on the setup data set into the setup registers after the setup end information has been detected.

3. The data processing system according to claim 2,
wherein the packet storage information includes a start address and a packet length in the memory that the packets including the setup data corresponding to its own data processing device are stored,
wherein the packet setup register retains startup information that allows the packet request generation circuit to generate the request signal by being supplied from the central processing unit,
wherein the packet request generation circuit generates the request signals for the packets of the number counted until the packet length is reached sequentially from the start address, after the startup information has been set into the packet setup register, and
wherein the transfer circuit counts the number of the packets that have been received in response to the request signals and detects that the packet length has been reached as the setup end information.

4. The data processing system according to claim 2,
wherein the packets further include a terminal flag,
wherein the packet storage information includes a start address in the memory that the packets including the setup data corresponding to its own data processing device,
wherein the packet setup register retains startup information that allows the packet request generation circuit to generate the request signal by being supplied from the central processing unit,
wherein the packet request generation circuit generates the request signals for the packets received until the setup end information is detected sequentially from the start address, after the startup information has been set into the packet setup register, and
wherein the transfer circuit detects the setup end information on the basis of the terminal flag included in the packets that have been received in response to the request signal.

5. The data processing system according to claim 3,
wherein the packet storage information further includes an endian mode of the packets,
wherein the transfer circuit further includes an endian conversion circuit, and
wherein the endian conversion circuit is a circuit that converts the endian of the received packets on the basis of the endian mode that is stored in the packet setup register.

6. The data processing system according to claim 2,
wherein the data processing device further includes a plurality of data processing modules and an internal bus to which the data processing modules are to be coupled, the transfer circuit, the packet setup register and the packet request signal generation circuit are coupled to the internal bus, and the setup registers are distributedly provided in the data processing modules in order to control data processing performed in the respective data processing modules,
wherein the data processing modules each includes each unique internal module identifier,
wherein the packets further include module shared information and the destination address includes a destination internal module identifier and an intra-internal-module destination address, and
wherein when the packets have been received, the transfer circuit
sets the payload concerned to the setup registers of the corresponding data processing modules in parallel, when the module shared information included in the packet concerned indicates that the payload included in the packet concerned is the setup data to be commonly set into the data processing modules, and
sets the payload concerned to the setup register that the intra-internal-module destination address indicates, of the data processing module that the destination internal module identifier indicates, when the module shared information included in the packet concerned indicates that the payload included in the packet concerned is not the setup data to be commonly set into the data processing modules.

7. The data processing system according to claim 1,
wherein the unique identifier, the destination identifier and the shared information that each of the data processing devices includes have digital values that are the same as one another in bit number, and
wherein when the packets have been received, the transfer circuit
masks the destination identifier included in the packet concerned in accordance with the shared information included in the packet concerned, compares the destination identifier with the identifier that is unique to its own data processing device and sets the payload concerned into the setup register corresponding to the destination address on condition that the unique identifier matches the destination identifier in not-masked bits.

8. The data processing system according to claim 6,
wherein an address of the internal bus has a digital value of a plurality of bits, some k1 bits of the address of the internal bus are allocated to the unique identifier that each of the data processing devices includes, other some k2 bits are respectively allocated to the data processing modules uniquely and remaining at least some k3 bits are allocated to the setup register (k1, k2 and k3 are two or more integers),
wherein the packets include an address mask, a destination internal address and the payload,
wherein the address mask and the destination internal address have digital values that are the same as each other in bit number and correspond to the address of the internal bus,
wherein in the address mask, the k1 bits are the shared information and the k2 bits are the module shared information,
wherein in the destination internal address, the k1 bits are the destination identifier, the k2 bits are the destination internal module identifier and the k3 bits are the intra-internal-modules destination address, and
wherein when the packets have been received, the transfer circuit
masks the destination internal address included in the packet concerned with an address mask included in the packet concerned, compares the k1 bit with the identifier that is unique to its own data processing device, sets that the destination identifier matches the unique identifier in not masked bits as a first condition and further sets the payload concerned into the setup register indicated by the intra-internal-module destination address of the data processing module that matches the not-masked bit in the k2 bits when the first condition has been met.

9. The data processing system according to claim 6,
wherein the data processing modules each is a circuit that executes image processing based on the setup data that has been set into the setup register that each data processing module concerned includes, and
wherein setting of the setup data into the setup register is made updatable picture by picture.

10. A data processing system comprising:
one or a plurality of data processing device(s), each including the data processing modules, a transfer circuit and an internal bus to which the data processing modules and the transfer circuit are to be coupled,
wherein the data processing modules are circuits that individually include a plurality of setup registers to which addresses in an internal address are respectively allocated and respectively execute data processing based on setup data set into the setup registers,
wherein the transfer circuit is a circuit that receives the packets that distributedly include the setup data and transfers the packets to the setup registers,
wherein the data processing modules respectively include internal module identifiers that are respectively unique to the data processing modules,
wherein the packets include module shared information, a destination internal module identifier, an intra-internal-module destination address and a payload, and
wherein when the packets have been received, the transfer circuit
sets the payload concerned into the setup registers of the corresponding data processing modules in parallel, when the module shared information included in the packet concerned indicates that the payload included in the packet concerned is the setup data to be commonly set into the data processing modules in parallel and
sets the payload concerned into the setup register that the intra-internal-module destination address indicates, of the data processing module that the destination internal module identifier indicates, when the module shared information included in the packet concerned indicates that the payload included in the packet concerned is not the setup data to be commonly set into the data processing modules.

11. A data processing system comprising:
a plurality of data processing devices that include a plurality of setup registers and make it possible to execute data processing based on setup data to be set into the setup register concerned in parallel;
a bus to which the data processing circuits are coupled and a memory and a central processing unit are respectively allowed to be coupled; and
a transfer circuit that receives the packets that distributedly include the setup data, transfers the packets to the setup registers and sets the packets into the setup registers,
wherein the data processing circuits each has a unique identifier allocated thereto and includes a packet setup register that retains packet storage information on the basis of which the packets that include setup data that corresponds to its own data processing device is stored into the memory by being supplied from the central processing unit and a packet request generation circuit that generates a request signal to be sent to the bus in order to read the packets out of the memory on the basis of the packet storage information that is stored in the packet setup register,
wherein the packets include a payload, shared information, a destination identifier and a destination address, and
wherein when the packets have been received, the transfer circuit
sets the payload concerned to the setup registers corresponding to the destination address in the corresponding data processing devices, when the shared information included in the packet concerned indicates that the payload included in the packet concerned is the setup data to be commonly set in parallel into at least some data processing devices including its own data processing device in the data processing devices, and sets the payload concerned to the setup register that is included in the data processing device that the destination identifier included in the packet concerned indicates and corresponds to the destination address included in the packet concerned, when the shared information included in the packet concerned indicates that the payload included in the packet concerned is not the setup data to be commonly set into the data processing devices.

12. The data processing system according to claim 11, further comprising:

a setup data read module that is arranged between the data processing devices and the bus and includes the transfer circuit, wherein the request signal that is output from each of the data processing devices undergoes arbitration and is supplied to the memory via the bus, and wherein when the packets have been received, the transfer circuit transfers the payload concerned to the corresponding data processing devices in parallel, when the shared information included in the packet concerned indicates that the payload included in the packet concerned is the setup data to be commonly set into at least some data processing devices including its own data processing device in the data processing devices.

13. The data processing system according to claim 11, further comprising:

a setup data read module that is arranged between the data processing devices and the bus and includes the transfer circuit and a cache memory, wherein the setup data read module inputs the request signal that is output from each of the data processing devices into the cache memory to make the cache memory perform cache control, when a cache miss occurs, cache-fills the packets corresponding to the request signal into the cache memory from the memory via the bus and then transfers the packets to the transfer circuit, and when a cache hit occurs, transfers the packets cached in the cache memory to the transfer circuit, and wherein when the packets have been received, the transfer circuit transfers the payload concerned to the corresponding data processing devices in parallel, when the shared information included in the packet concerned indicates that the payload included in the packet concerned is the setup data to be commonly set into at least some data processing devices including its own data processing device in the data processing devices.

14. The data processing system according to claim 11, further comprising:

a setup data read module that is arranged between the data processing devices and the bus and includes a cache memory, wherein the data processing devices respectively include the transfer circuits, wherein the setup data read module inputs the request signal that is output from each of the data processing devices into the cache memory to make the cache memory perform cache control, when a cache miss occurs, cache-fills the packets corresponding to the request signal into the cache memory from the memory via the bus and then transfers the packets to the transfer circuit of the data processing device that has sent out the request signal, and when a cache hit occurs, transfers the packets cached in the cache memory to the transfer circuit of the data processing device that has sent out the request signal, and wherein when the packets have been received, the transfer circuit sets the payload concerned to the setup register corresponding to the destination address, when the shared information included in the packet concerned indicates that the payload included in the packet concerned is the setup data to be commonly set into at least some data processing devices including its own data processing device in the data processing devices, and sets the payload concerned to the setup register corresponding to the destination address, on condition that the destination identifier matches its own identifier when the shared information included in the packet concerned indicates that the payload included in the packet concerned is not the setup data to be commonly set into the data processing devices.

15. The data processing system according to claim 1, wherein the unique identifier, the destination identifier and the shared information that each of the data processing devices includes have digital values that are the same as one another in bit number.

16. The data processing system according to claim 1, wherein when the packets have been received, the transfer circuit masks the destination identifier included in the packet concerned in accordance with the shared information included in the packet concerned, compares the destination identifier with the identifier that is unique to its own data processing device and sets the payload concerned into the setup register corresponding to the destination address on condition that the unique identifier matches the destination identifier in not-masked bits.

17. The data processing system according to claim 1, wherein a central processing device that performs initial settings on the data processing devices is not parallelized.

18. The data processing system according to claim 6, wherein an address of the internal bus has a digital value of a plurality of bits, some k1 bits of the address of the internal bus are allocated to the unique identifier that each of the data processing devices includes, other some k2 bits are respectively allocated to the data processing modules uniquely and remaining at least some k3 bits are allocated to the setup register (k1, k2 and k3 are two or more integers).

19. The data processing system according to claim 6, wherein the packets include an address mask, a destination internal address and the payload, wherein the address mask and the destination internal address have digital values that are the same as each other in bit number and correspond to the address of the internal bus, wherein in the address mask, the k1 bit is the shared information and the k2 bit is the module shared information, wherein in the destination internal address, the k1 bit is the destination identifier, the k2 bit is the destination internal module identifier and the k3 bit is the intra-internal-modules destination address.

20. The data processing system according to claim 6, wherein when the packets have been received, the transfer circuit masks the destination internal address included in the packet concerned with an address mask included in the packet concerned, compares the k1 bit with the identifier that is unique to its own data processing device, sets that the destination identifier matches the unique identifier in not masked bits as a first condition and further sets the payload concerned into the setup register indicated by the intra-internal-module destination address of the data processing module that matches the not-masked bit in the k2 bits when the first condition has been met.

21. The data processing system according to claim 1, wherein, when the packets have been received, the transfer circuit sets the payload concerned to the setup register corresponding to the destination address, when the shared information included in the packet concerned indicates that the payload included in the packet concerned is the setup data to be concurrently set into at least some data processing devices including its own data processing device in the data processing devices, and sets the payload concerned to the setup register corresponding to the destination address on condition that the destination identifier matches its own identifier, when the shared information included in the packet concerned indicates that the payload included in the packet concerned is not the setup data to be concurrently set into the data processing devices.

22. The data processing system according to claim 1, wherein the plurality of data processing devices that respectively include the plurality of setup registers to execute data processing based on setup data that has been set concurrently into at least some of the setup registers parallelized with one another.

* * * * *